(12) United States Patent
Adkins

(10) Patent No.: US 7,047,857 B2
(45) Date of Patent: May 23, 2006

(54) WATER JET CUTTING MACHINE

(75) Inventor: Daniel Adkins, 1131 Tower Rd., Corbin, KY (US) 40701

(73) Assignees: Intense Speed, LLC, Corbin, KY (US); Daniel Adkins, Corbin, KY (US)

( * ) Notice: Subject to any disclaimer, the term of this patent is extended or adjusted under 35 U.S.C. 154(b) by 299 days.

(21) Appl. No.: 10/304,636

(22) Filed: Nov. 26, 2002

(65) Prior Publication Data

US 2004/0099111 A1   May 27, 2004

(51) Int. Cl.
*B26D 5/08* (2006.01)

(52) U.S. Cl. .............................. 83/549; 83/53; 83/177; 83/550; 83/551

(58) Field of Classification Search ............... 83/53, 83/177, 549–551, 614, 719, 602; 74/107, 74/122, 124–5, 337.5, 838–9
See application file for complete search history.

(56) References Cited

U.S. PATENT DOCUMENTS

| | | | | |
|---|---|---|---|---|
| 1,511,016 A | * | 10/1924 | Prescott ........................ | 83/483 |
| 2,527,739 A | * | 10/1950 | Knabusch et al. ............ | 83/208 |
| 2,959,359 A | * | 11/1960 | Casaletto ..................... | 239/455 |
| 3,226,527 A | * | 12/1965 | Harding ....................... | 219/384 |
| 3,718,061 A | * | 2/1973 | Wilkin ......................... | 83/155 |
| 3,958,472 A | * | 5/1976 | Kabanov et al. .............. | 83/879 |
| 3,978,748 A | | 9/1976 | Leslie et al. | |
| 4,048,885 A | | 9/1977 | Miyakita et al. | |
| 4,435,902 A | | 3/1984 | Mercer et al. | |
| 4,444,077 A | * | 4/1984 | Wise et al. ................... | 83/319 |
| 4,641,556 A | * | 2/1987 | Vigneron et al. ............. | 83/36 |
| 4,841,620 A | * | 6/1989 | Kadlub ....................... | 29/426.4 |
| 4,962,568 A | * | 10/1990 | Rudy et al. ................. | 452/157 |
| 5,031,496 A | * | 7/1991 | Lobash et al. ............... | 83/107 |
| 5,083,487 A | * | 1/1992 | Croteau ........................ | 83/29 |
| 5,133,687 A | * | 7/1992 | Malloy ........................ | 452/149 |
| 5,296,211 A | * | 3/1994 | Baldus et al. ............... | 423/302 |
| 5,365,816 A | | 11/1994 | Rudy | |
| 5,367,929 A | | 11/1994 | Burch et al. | |
| 5,439,328 A | * | 8/1995 | Haggerty et al. ........... | 408/1 R |
| 5,767,481 A | | 6/1998 | Graf | |
| 5,868,056 A | * | 2/1999 | Pfarr et al. ................... | 83/578 |
| 5,874,033 A | | 2/1999 | Meeker | |
| 6,006,637 A | | 12/1999 | Sanders et al. | |
| 6,101,912 A | | 8/2000 | Sanders et al. | |
| 6,125,729 A | * | 10/2000 | Mirabello .................... | 83/177 |
| 6,475,323 B1 | * | 11/2002 | Ohmi et al. ................. | 156/239 |
| 6,634,928 B1 | * | 10/2003 | Erickson et al. ............. | 451/40 |
| 6,826,989 B1 | * | 12/2004 | Wattles et al. ............... | 83/102 |

* cited by examiner

*Primary Examiner*—Allan N. Shoap
*Assistant Examiner*—Carolyn Blake
(74) *Attorney, Agent, or Firm*—King & Schickli, PLLC

(57) ABSTRACT

A machine for cutting the border of a workpiece using one or more water jet cutting tools separately carried by one or more monorail track mounted carriage assemblies is disclosed. The machine can also include an aperture forming apparatus for forming circular openings and/or elongated slots in the workpiece prior to/or simultaneously with the border trimming operation, all while the workpiece occupies a single work station in the machine. In one embodiment, the aperture forming apparatus features a cutting tool mounted on an elongate arm affixed to and extending from a plate which is fixedly oriented in a horizontal plane. While so oriented, a motor and gear assembly causes the plate to wobble in a circular pattern in the plane to, in turn, cause the tool to make a circular cut in the workpiece. In another embodiment of the apparatus, a motor rotates a cam carried on a free end of a stationary arm, the cam containing an eccentrically mounted cutting tool.

13 Claims, 31 Drawing Sheets

FIG. 1e
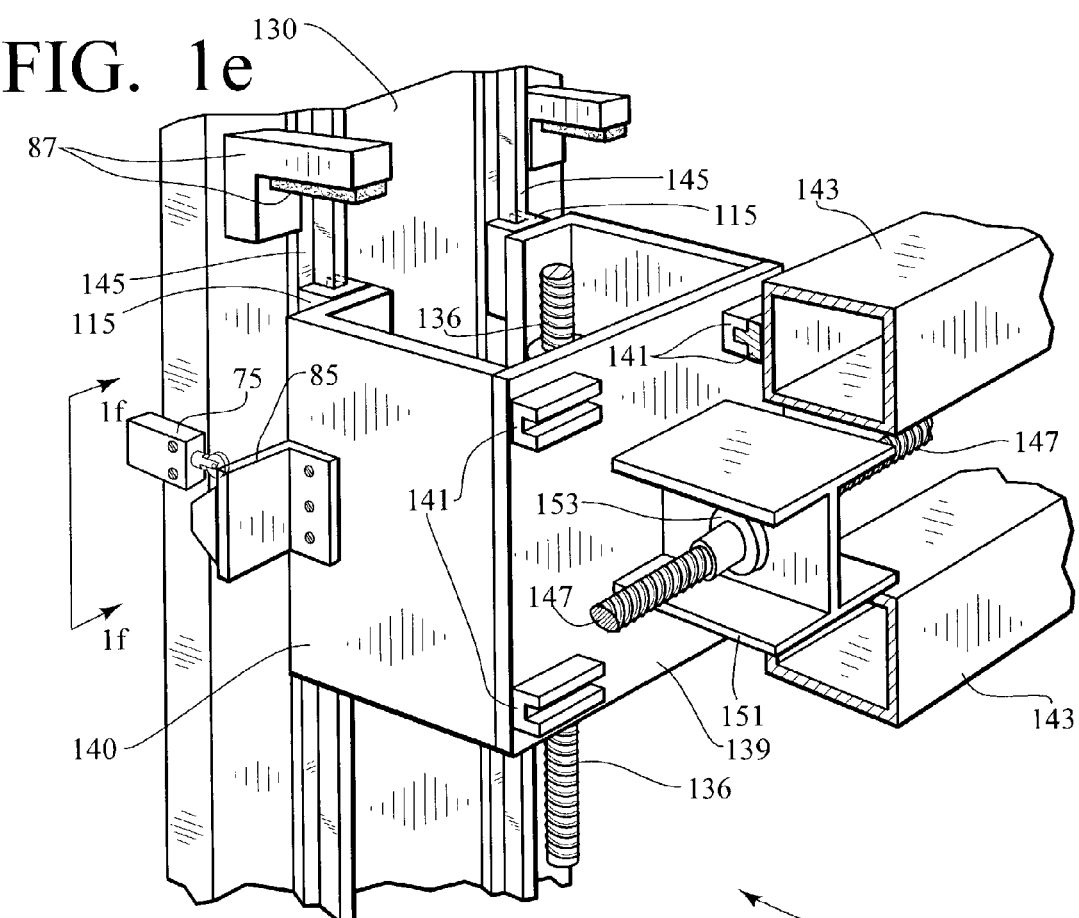
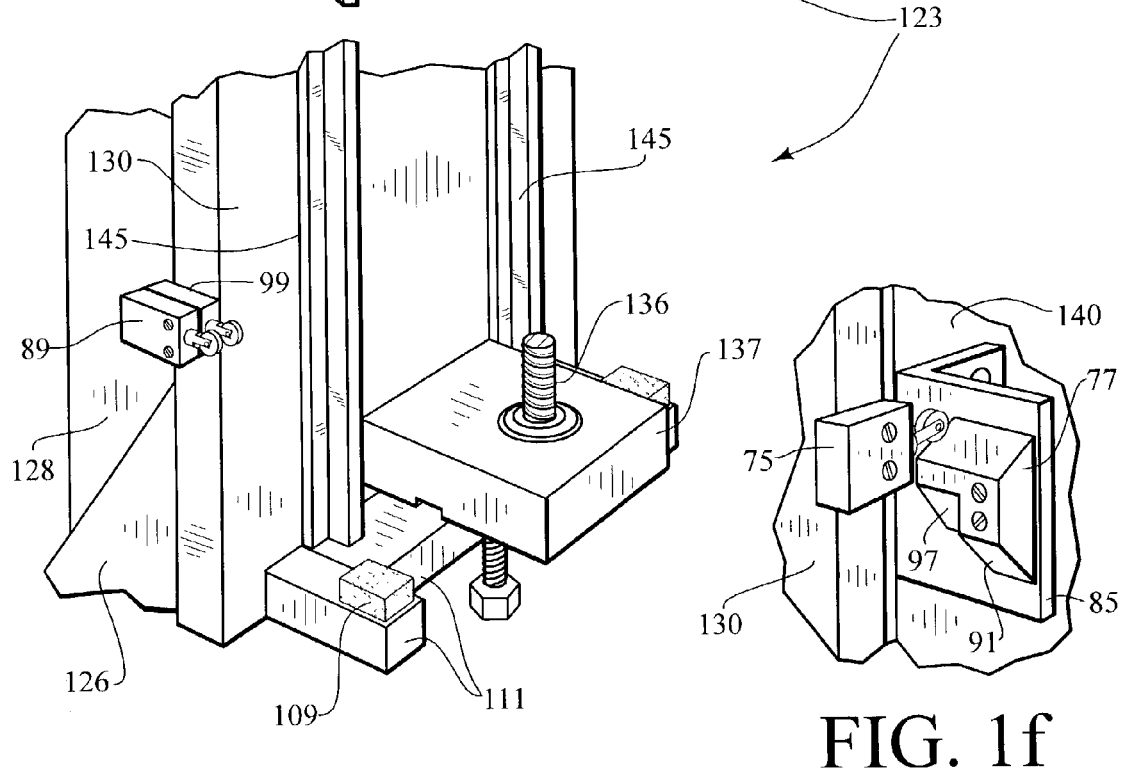
FIG. 1f

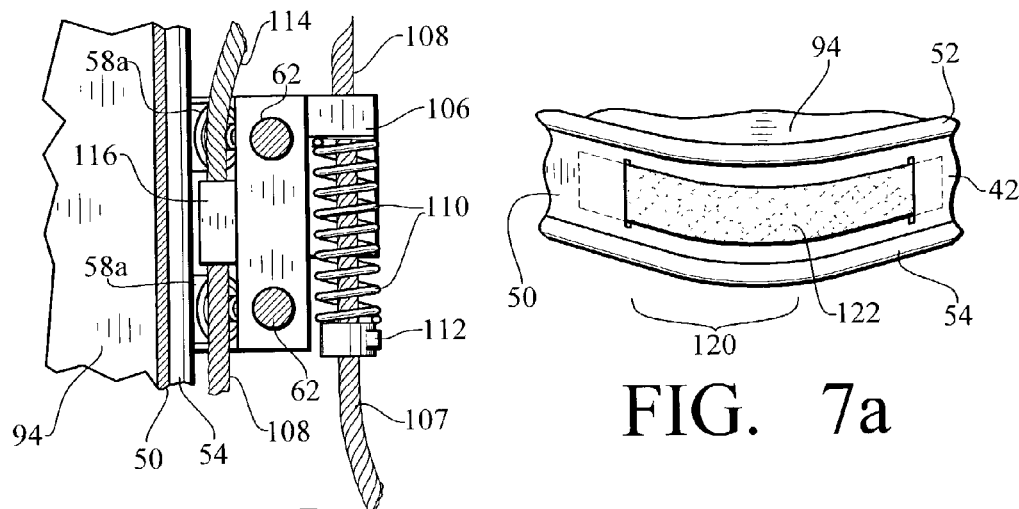
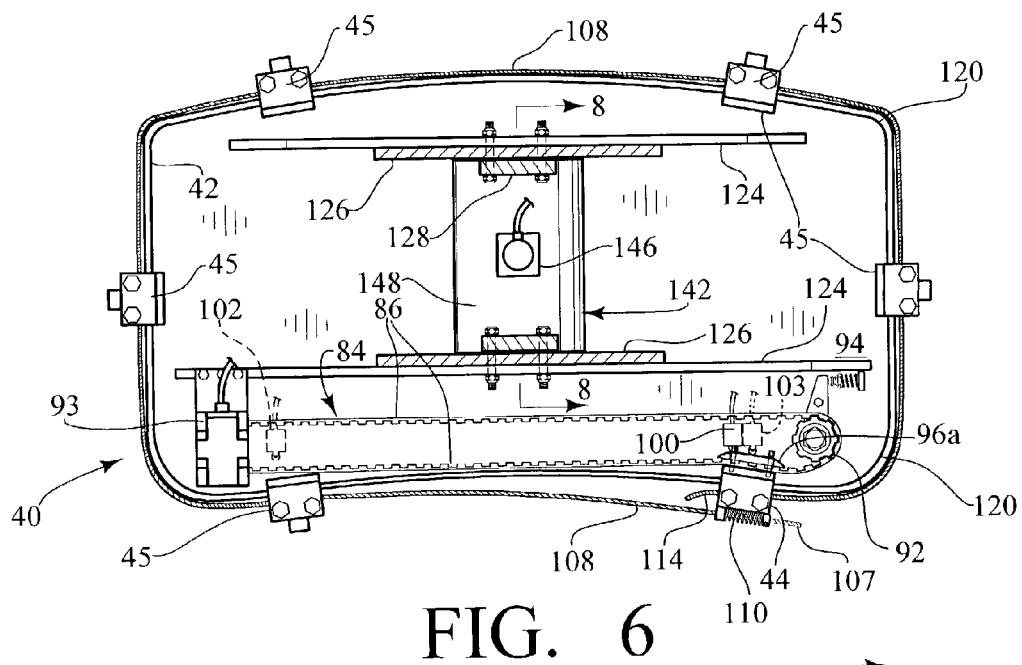
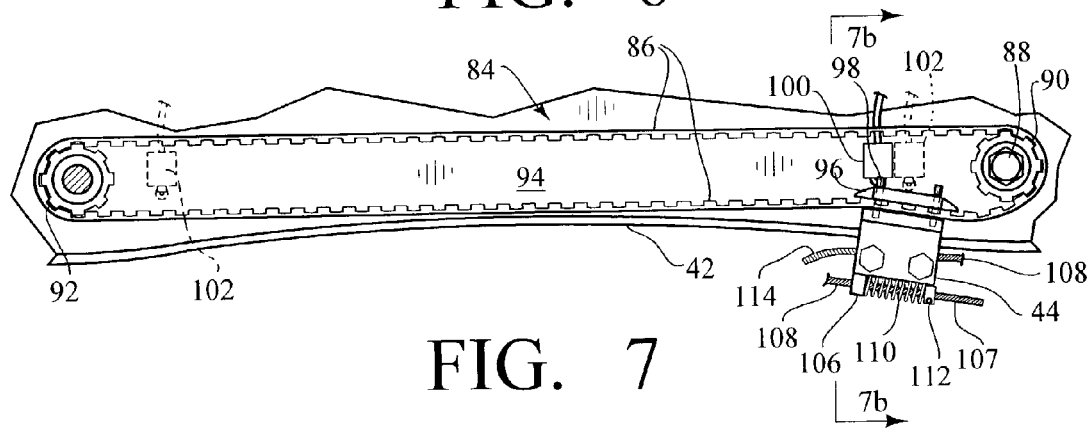

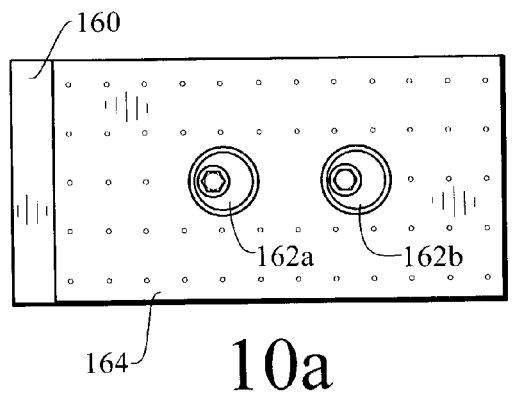
10a
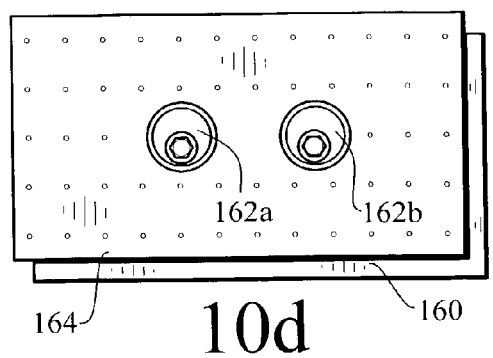
10d
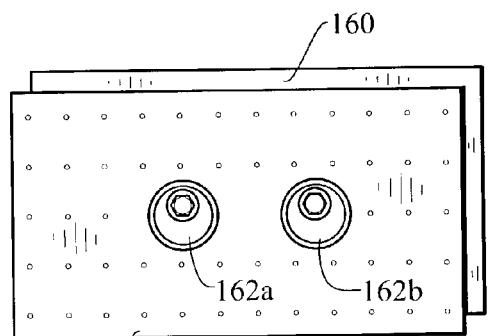
10b
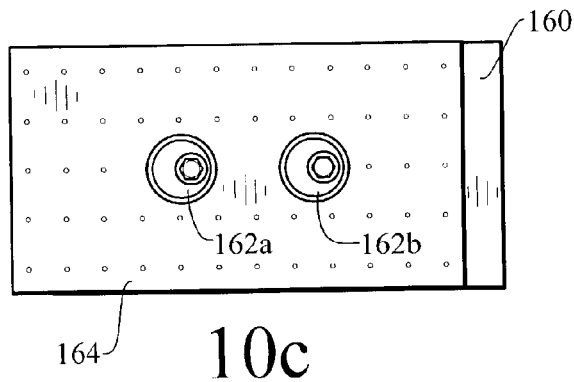
10c

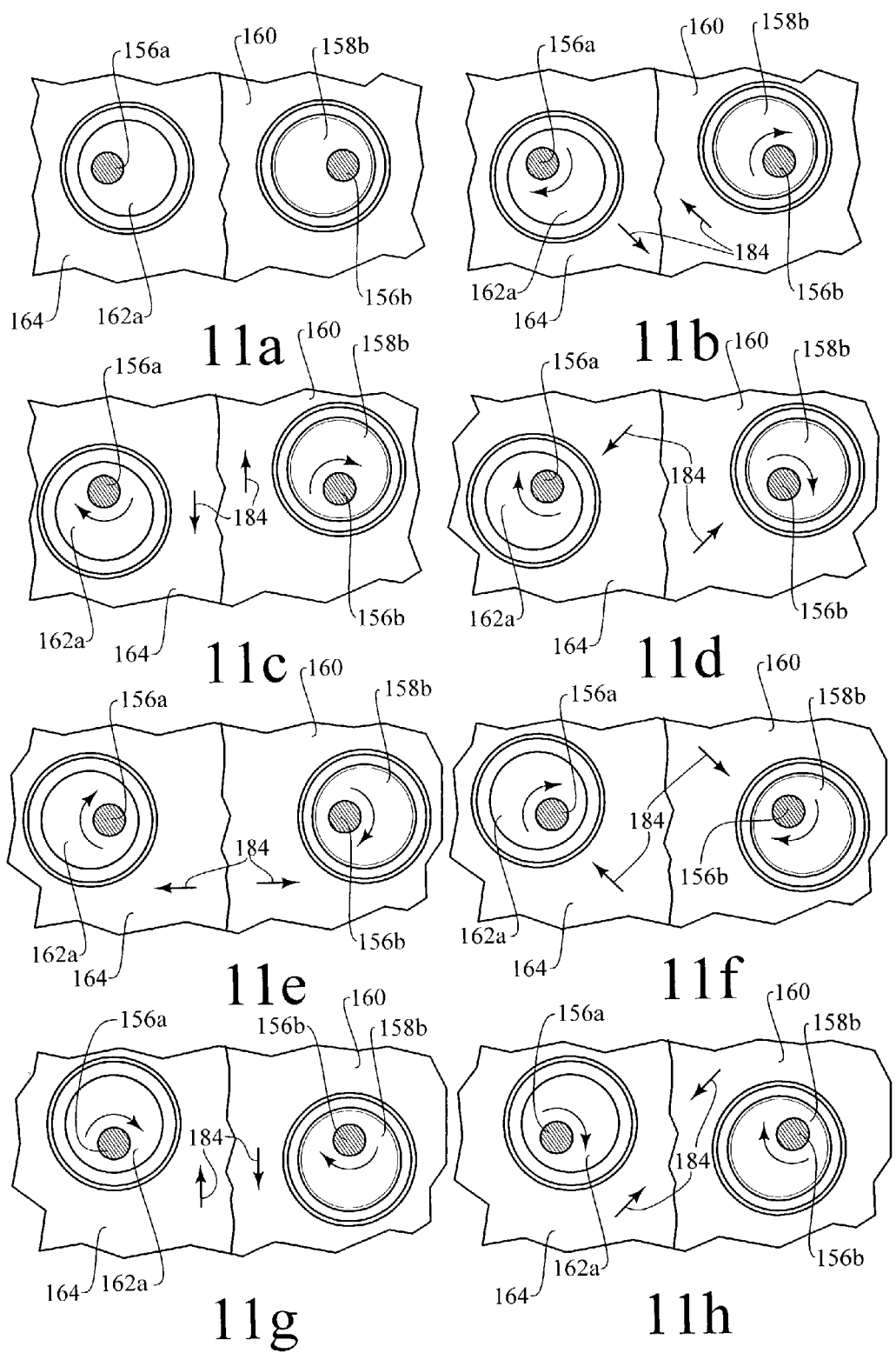

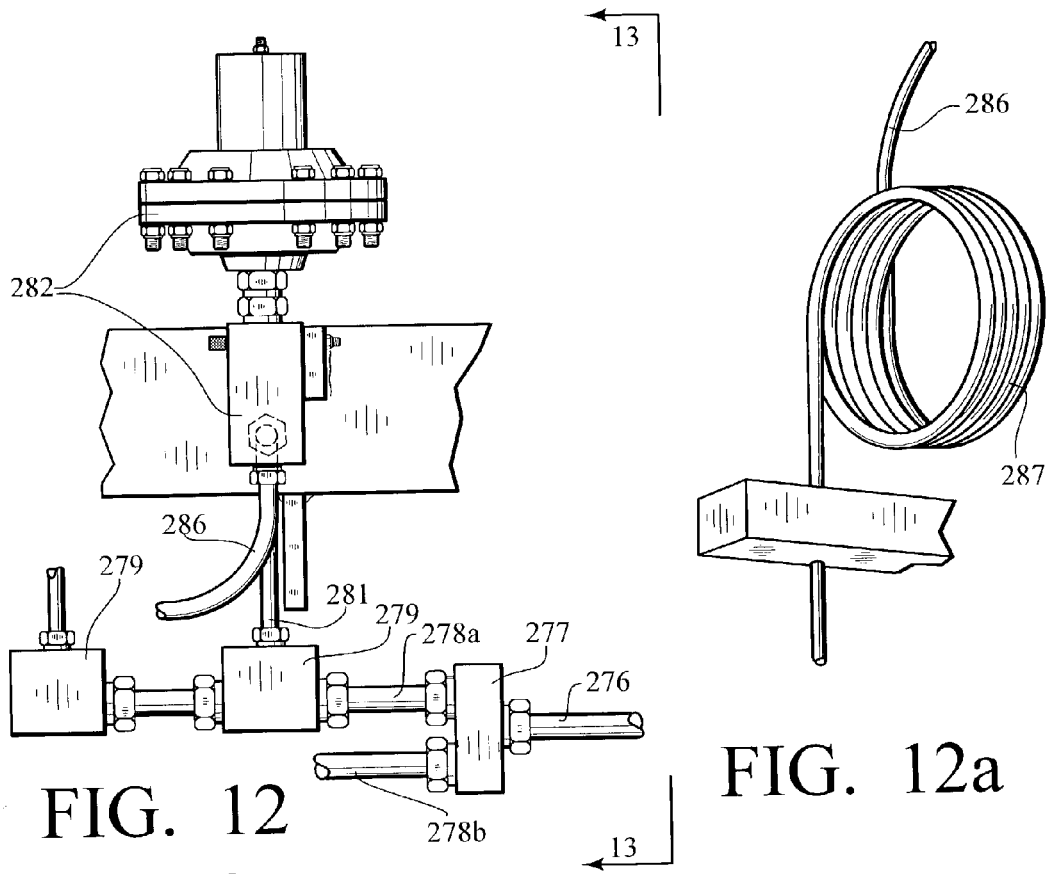
FIG. 12
FIG. 12a
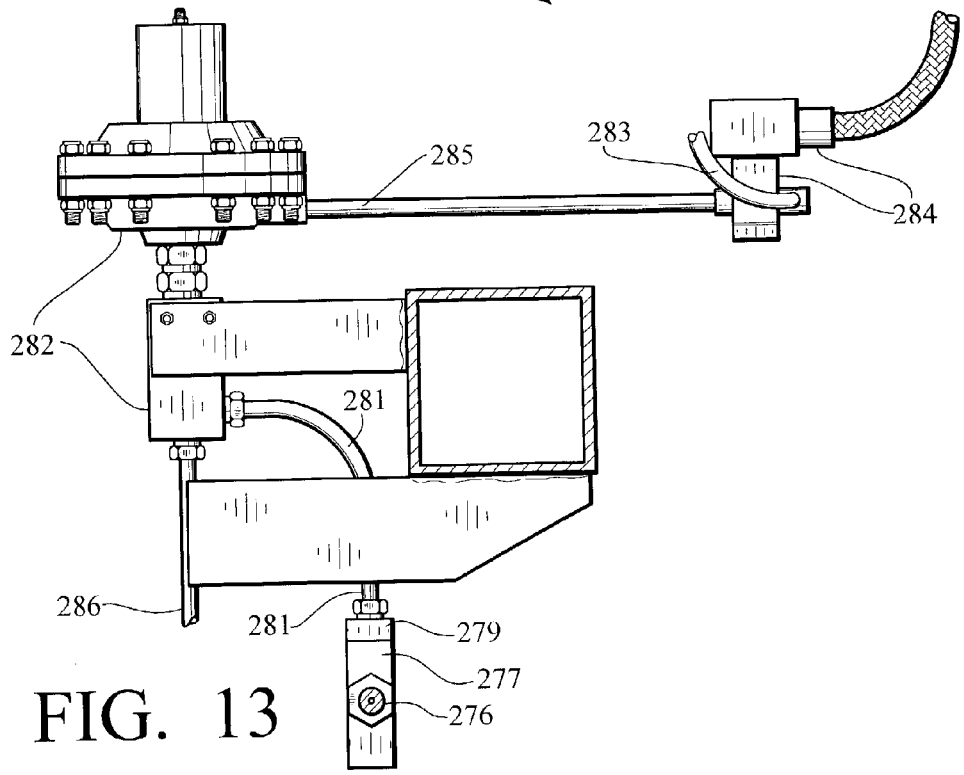
FIG. 13

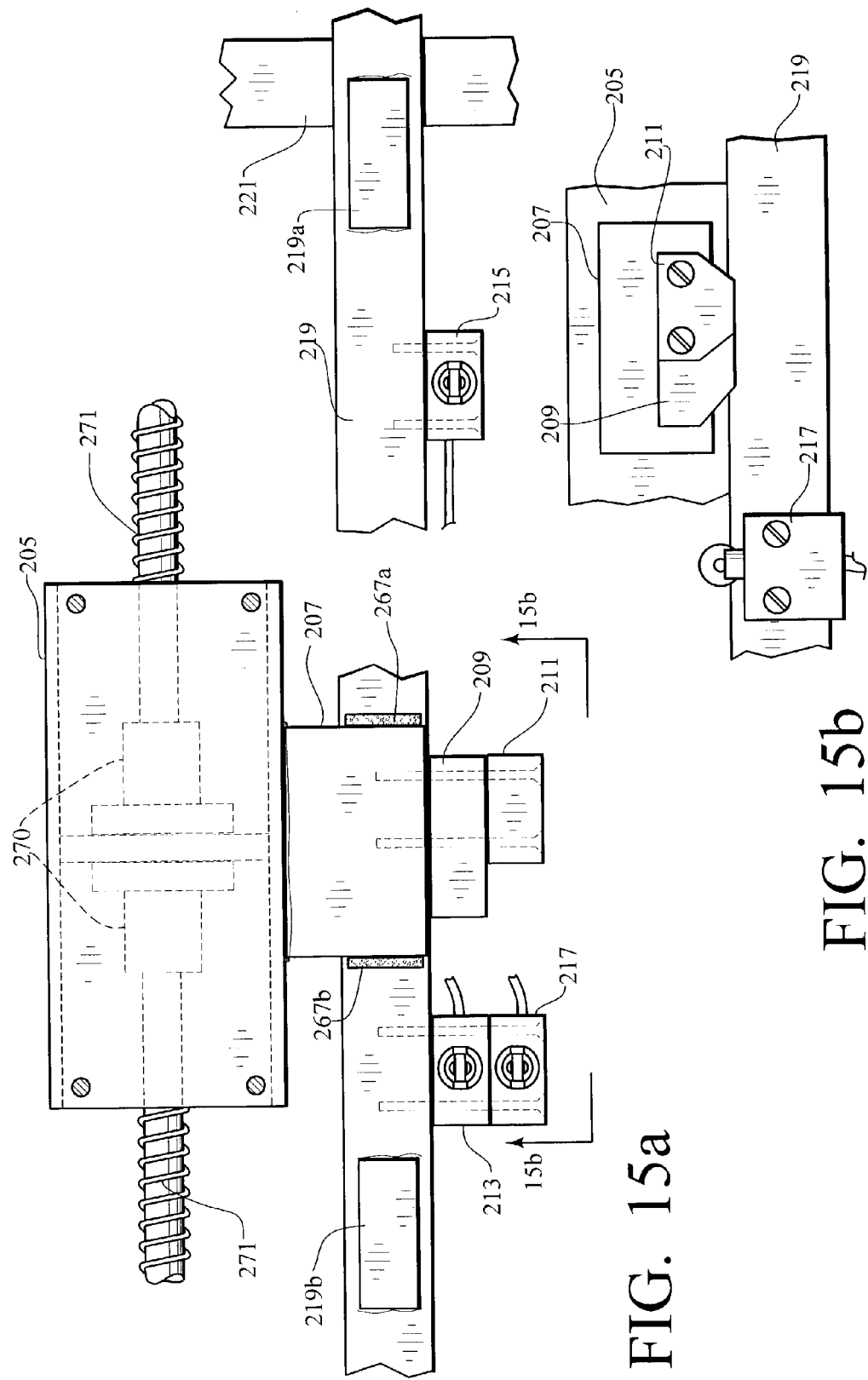

WATER JET CUTTING MACHINE

This application includes a CD-ROM appendix. The total number of compact discs in the appendix, including a duplicate, is two. The size of the file is 120 KB, saved under the file name of Proto_Type_4_HSRV_FINAL_10PART1_2.slc, created on Jul. 21, 2002.

BACKGROUND OF THE INVENTION

This invention relates generally to high pressure water jet cutting machines for both edging and bordering, and for forming circular openings and elongated slots in a workpiece. More specifically, the invention relates to such machines wherein bordering is accomplished by one or more water jet cutting tools separately carried on one or more monorail track mounted carriage assemblies and wherein aperture formation is accomplished by one or more cutting tools separately mounted on a like number of arms extending from a plate which is fixedly oriented in a horizontal plane, while circularly oscillating in such plane, or by one or more cutting tools eccentrically positioned on a like number of cams, wherein each cam is rotatably mounted on a different stationary arm.

Broadly speaking, high pressure water jet cutting machines, which employ one or more water jet cutting tools individually and separately mounted on a like number of computer controlled robotic arms for fashioning borders and for forming apertures in a workpiece, have long been known and used in the prior art. One difficulty that has been encountered using such a robotic arm carried water jet cutter results from the relatively large amount of operating space often required for placement and movement of the arm, especially when used for trimming edges or borders of a workpiece. Such large operating space requirements can often severely limit and even, in some cases, prevent the simultaneous use of two or more robotic arm cutters to reduce border cutting time, as well as aperture cutting time where several holes and/or slots are to be cut in a single workpiece. Such limitations arise due to the necessity of avoiding collisions between two or more simultaneously operating robotic arms.

Another difficulty that has been encountered using a robotic arm mounted water jet cutting tool is in the relatively large amount of time required to cut an individual hole in a workpiece. Typically, where a hole is to be cut in a foam material, such as urethane, for example, mechanical movement of the arm to the required operating position, plus activation and subsequent deactivation of a high pressure water valve connected to the water jet cutting nozzle on the arm, will take no less than 2.0 seconds to cut a single hole in the material. Furthermore, if space requirements do not permit the ganging of two or more robotic arm cutters to simultaneously cut two or more holes required in a workpiece, then, typically, it can take at least 2.0 seconds for one robotic arm cutter to cut each separate hole sequentially.

Still another difficulty encountered in using a computer controlled robotic arm carried water jet cutting tool is the relatively high cost of each such arm.

It, therefore, would be desirable to provide a water jet cutting machine which can cut both edges or borders and apertures in a workpiece, which completely eliminates the need for expensive robotic arms. It would also be desirable to provide such a machine which greatly improves the ability to gang water jet cutters for simultaneous operation, both in edge trimming and in cutting numerous apertures, holes and/or slots in a workpiece to reduce overall cutting time. It would further be desirable to provide such a machine that has the capability of reducing individual hole cutting time from the at least 2 seconds, as required by a robotic arm cutter, to no more than about 0.4 seconds.

By means of my invention, these and other difficulties encountered using prior art robotic arm carried water jet cutting tools are substantially eliminated.

BRIEF DESCRIPTION OF THE DRAWINGS

FIG. 1b shows a cross sectional view of part of the machine portion of FIG. 1a as viewed along cross section lines 1b—1b of FIG. 1a.

FIG. 1e shows a perspective view of a fragment of the machine portion of FIG. 1a.

FIG. 1f shows a detailed perspective of part of the fragment of FIG. 1e as seen along view lines 1f—1f of the latter mentioned figure.

FIG. 5 shows a cross-section view of a portion of the carriage of FIGS. 2–4 as viewed along cross-section lines 5—5 of FIG. 3.

FIG. 6 shows a top plan view of a endless monorail track of the machine of FIG. 1 illustrating a generalized track geometry and containing a series of water jet carriage assemblies of the type shown in FIGS. 2–5.

FIG. 7 shows an enlarged detail view of a portion of the monorail track of FIG. 6 containing a motorized belt drive unit and cable arrangement for moving the carriage assemblies of FIG. 6 along separate portions of the monorail track.

FIG. 7a shows a detail perspective of a corner portion of the monorail track of FIG. 6.

FIG. 9b shows an elevation view of a pair of rotary cams mounted on one of a pair of cam shafts of the assembly of FIGS. 8–9 and also containing the follower gear of FIG. 9a.

FIGS. 10a–10d show bottom plan views of a pair of cam operated movable plates of the hole cutting assembly of FIGS. 8–10 illustrating four different positions of the plates relative to each other which occur during one cycle of cam operation.

FIGS. 11a–11h show cross section views of portions of the plates of the hole cutting assembly of FIGS. 8–10d as viewed along cross section lines 11—11 of FIG. 8 illustrating eight different positions of a lower plate cam relative to an upper plate cam during one cycle of operation of the cams.

FIG. 12 shows a side elevation view of a portion of the cutting machine of FIG. 1 containing a rear most one of several compressed air activated ON/OFF water valves in a high pressure water supply for the cutting machine.

FIG. 12a shows a perspective view of a coil formed in one of several high pressure water lines of the machine FIG. 1.

FIG. 13 shows a cross section view of the cutting machine portion of FIG. 12 as viewed along cross section lines 13—13 of the latter mentioned figure and also showing an electrically activated solenoid for operating the water valve of FIG. 12 with compressed air.

FIG. 14c shows a perspective view of a fragment of the support table assembly of FIGS. 14 and 14a.

FIG. 15a shows a plan view of a portion of the support table assembly of FIGS. 14 and 15 showing a system for terminating movement of the table at opposite ends of travel.

FIG. 15b shows a side elevation view of a fragment of the movement terminating system of FIG. 15a.

DESCRIPTION OF THE PREFERRED EMBODIMENTS

Figure 1:
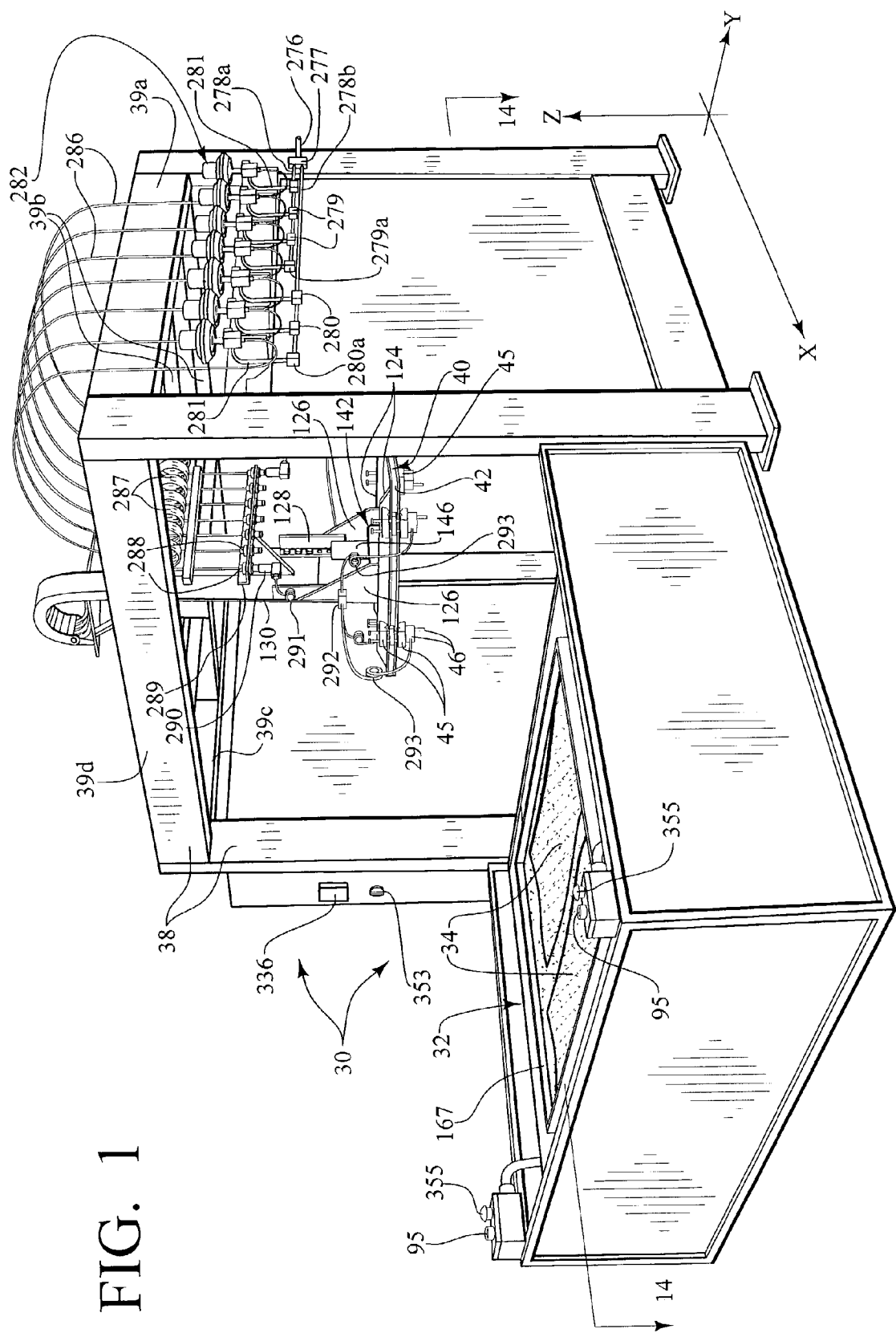
FIG. 1 shows a perspective view of a water jet cutting machine, thus illustrating a preferred embodiment of my invention.

Referring now to the drawing figures and, in particular, to FIGS. 1–17, there is shown, in a preferred embodiment of my invention, a high pressure water jet cutting machine, an overall view of which is shown in FIG. 1 and generally designated 30. The machine 30 includes a table 32 for supporting one or more workpieces 34 to be cut. The table 32 is mounted on a set of conventional linear motion slide blocks and rails 36 (FIGS. 14–15) for movement between an operative position, within a box frame 38 having upper beam members 39a, b, c and d (FIG. 1) of the machine 30, and an extended, workpiece loading/unloading position in front of the frame, the table being in the latter mentioned position in FIGS. 1 and 14. The machine 30 also includes a cutting apparatus, generally designated 40 (FIGS. 1 and 6), which is located within the frame 38 over the table 32, when operatively positioned, which can be adapted for cutting both the borders of the workpieces 34 as well as openings, holes, and/or slots therethrough. The cutting apparatus 40 includes a monorail track 42 and at least one and, preferably, several carriage assemblies 44, 45 movably mounted on the track. The carriage assemblies 44,45 each carry a nozzled high pressure water jet cutting tool 46 for movement along the track 42 to accomplish cutting of the desired borders of the workpiece 34. The track 42 may be shaped to provide the desired path of travel for the assemblies 44,45 and tools 46 and may be open ended or, as preferred and shown, may be endless so as to enclose an area over the operatively positioned table 32 having a perimeter forming a preselected closed path.

Figure 2:
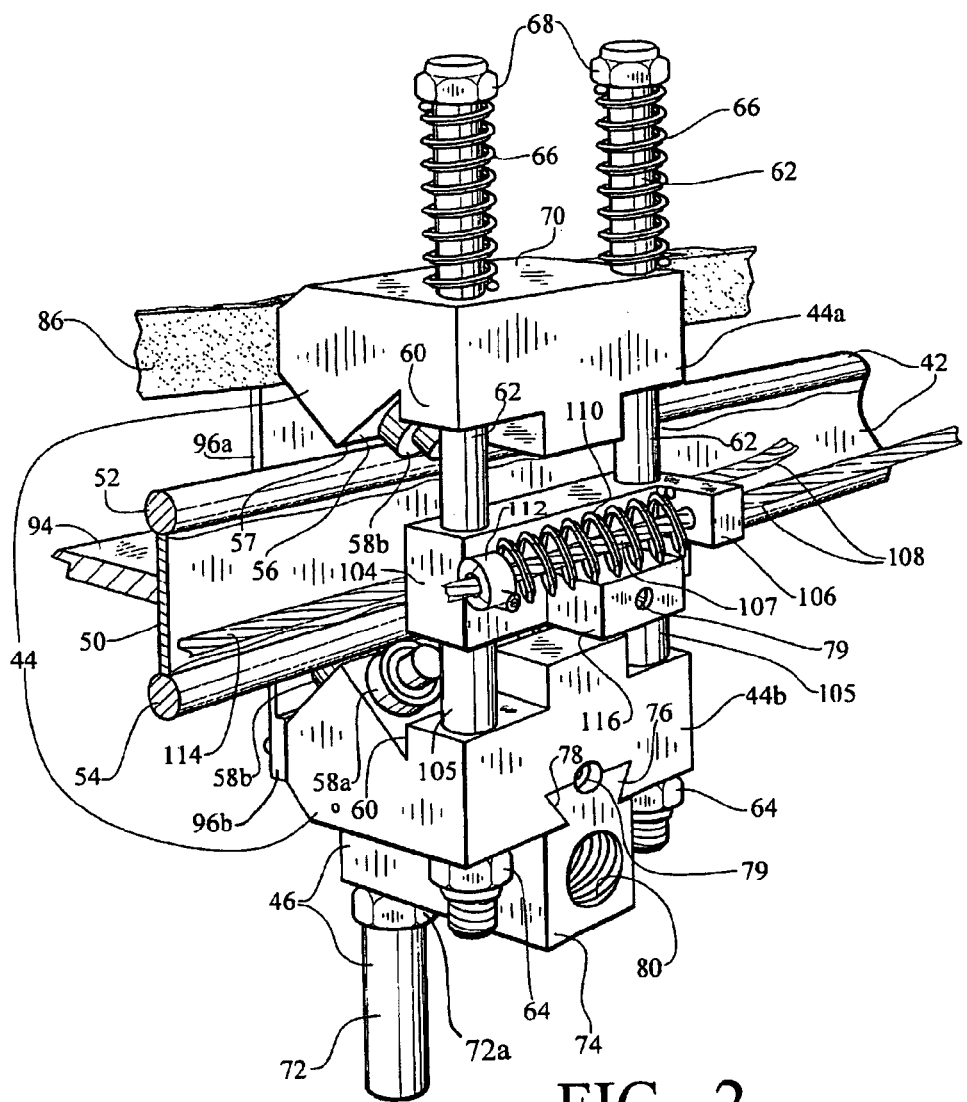
FIG. 2 shows a perspective view of a monorail track mounted water jet carriage assembly of the machine of FIG. 1.
Figure 3:
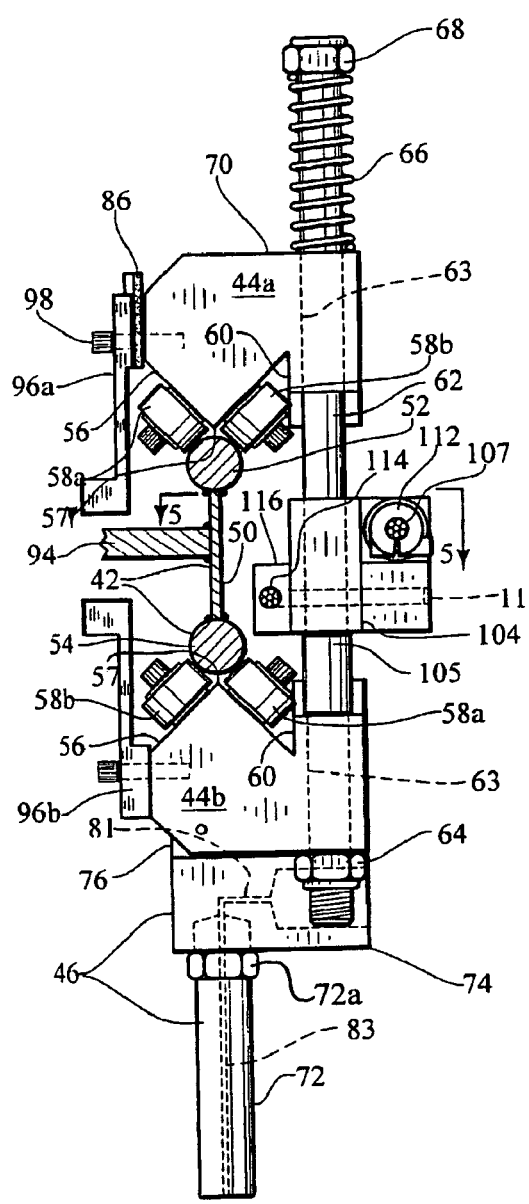
FIGS. 3–4 show end and side elevation views, respectively, of the water jet carriage assembly of FIG. 2.
Figure 4:
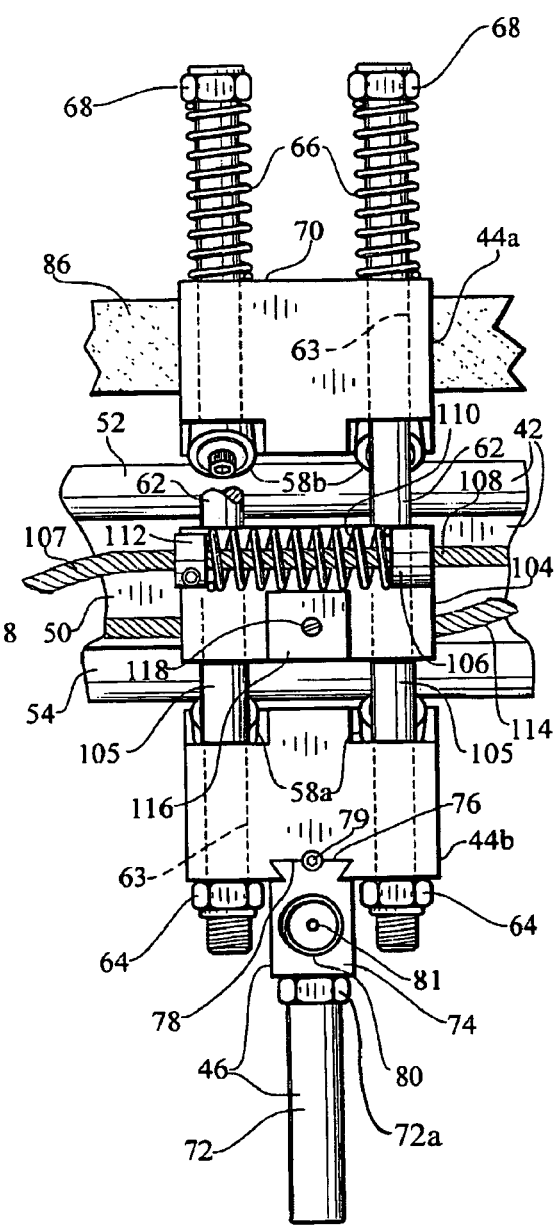

Referring now, more specifically, to FIGS. 2–4, the track 42 of FIG. 1 is shown in detail and includes an elongate, relatively thin steel band or strip 50. A pair of steel rods 52, 54, preferably having diameters which are greater than the thickness of the strip 50, are affixed, as, for example, by being welded, to upper and lower edges of the strip, respectively. The rods 52, 54 thus form upper and lower bearing surfaces, respectively, of the track 42 along which rollers 58a, 58b mounted on the various carriage assemblies 44, 45 can travel. A specific example of the track 42 includes the strip 50 being of any desired length and being 1 inch in width by ¹⁄₁₆ inch in thickness, the bearing surfaces 52, 54 each having a diameter of ¼ inch. The track 42, having such dimensions, for example, can readily be shaped by hand or machine to form the desired path or course, such as that shown in FIG. 6. Of course, the track 42 can be of any desired and reasonable dimensions and can be machined out of solid stock.

Referring now to FIGS. 2–7, a preferred embodiment of a representative one of the carriage assemblies 44 of FIG. 1 is shown in detail for movement on the track 42 and includes an upper carriage member 44a and a lower carriage member 44b. A base portion of the upper member 44a contains a pair of diagonally extending walls 56 (FIGS. 2–3) which meet along a common bottom edge 57 directly above the upper bearing surface 52 to form a triangularly shaped base as best seen in FIGS. 2–3. A first pair of rollers 58a is rotatably mounted in line with the track 42 on one of the walls 56 and a second pair of rollers 58b is rotatably mounted in line with the track on the other one of the walls. The roller pairs 58a, 58b are thus inclined relative to one another to form a V-shaped angle for rollably bearing on the upper bearing surface 52 as best seen in FIG. 3. The angle of the V-shape is preferably 90 degrees such that the roller pairs 58a, 58b are each inclined against the upper bearing surface 52 at adjacent and opposing 45 degree angles with respect to a vertical line through the center of the upper bearing surface. An upper end portion of the lower carriage member 44b may be identical in construction to the lower end portion of the upper member 44a, the former being oriented upside down relative to the latter and, due to an outwardly projecting block 60 (relative to the closed track 42), is also rotated 180 degrees horizontally from the latter.

The upper and lower members 44a, 44b are joined to one another by a pair of vertically and parallel extending, spaced apart bolts 62 having smooth surfaces which slidably extend through smooth bores 63 (FIGS. 3–4) formed through the block 60. Lower end portions of the bolts 62, projecting beneath the lower block 60, are exteriorly threaded to receive nuts 64 upon which the lower carriage member 44b is seated. Upper end portions of the bolts 62 project upwardly out of upper ends of upper bores 63 in the upper member 44a. Biasing springs 66 surround the upper end portions of the bolts 62 and are trapped in compression between bolt heads 68 and an upper surface 70 of the upper member 44a. In this manner, the lower member 44b is drawn upwardly toward the upper member 44a such that the respective rollers of the upper and lower members bear against the upper and lower bearing surfaces 52, 54 of the track 42. The springs 66 also allow for vertical movement of the members 44a, 44b relative to one another along the bolts 62 due to any unevenness that may exist in the width of the track 42 over the length of travel of any of the carriage assemblies 44. The springs 66 also permit movement between the members 44a, 44b to enable them to travel around curves in the track 42.

A single one of the water jet cutting tools 46 is adjustably attached to each of the lower carriage members 44b. The tools 46 each have a nozzle tube 72b, a nozzle nut 72a conventional nozzle 72 which, in the present example, opens downwardly toward the operatively positioned table 32. Each of the tools 46 also include a block 74, from which the nozzle 72 projects, which is slidably adjustably attached to a lower end portion of the lower carriage member 44b. An upper surface of the block 74 contains a raised key 76 which closely and slidably fits within a conforming recessed keyway 78 in a bottom portion of the lower member 44b as best seen in FIGS. 2 and 4. High pressure water to operate each of the tools 46 enters the corresponding block 74 through an inlet connection port 80 facing outwardly away from the track 42, for ease of access. Accordingly, each nozzle 72 can be adjusted horizontally toward or away from the track by sliding the block 74 in an appropriate direction along the keyway 78. Such adjustment is accomplished by turning an Allen head screw 79 in the appropriate direction as later more fully explained with reference to FIGS. 27–28. The inlet connection port 80 communicates, through a bore 81 in the block 74, with an upper end of a water flow channel 83 extending downwardly through the nozzle tube 72b then through the nozzle 72 that is secured to the nozzle tube 72b by the nozzle nut 72a, See FIG. 3.

Figure 4A:
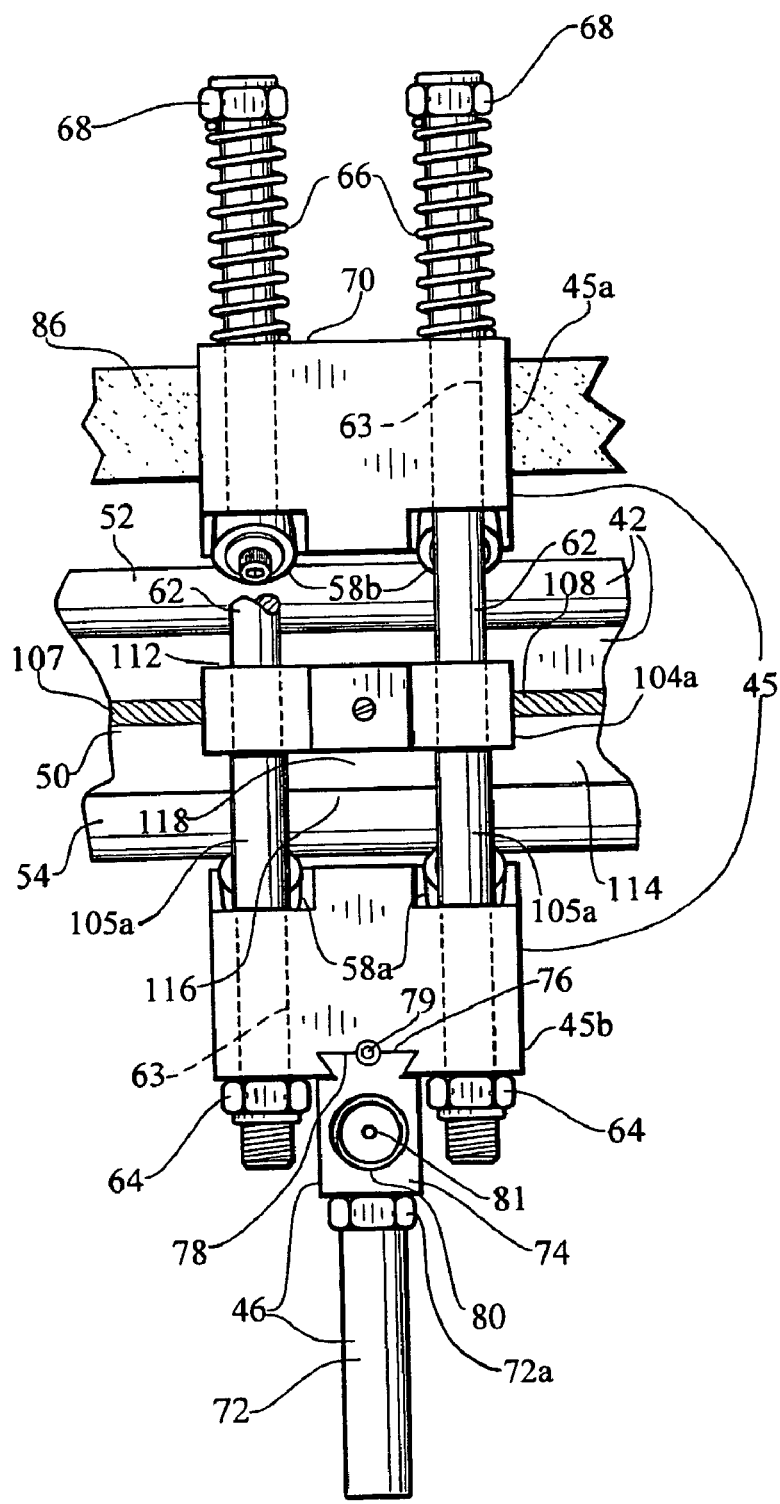
FIG. 4a shows a side elevation view of a cable driven water jet carriage assembly of the machine of FIG. 1.

In the present example, the carriage assemblies 44, 45 (there being six in the present example) are spaced apart and located at different start positions around the track 42 as shown in FIG. 6. Each of the assemblies 44, 45 is positioned to move forward and backward, on command, along a different portion of the track 42 so that edging or border cutting of the workpiece 34 can be accomplished in a fraction of the time it would take for a single one of the assemblies 44 to traverse the entire course by itself. The assembly 44 shown in FIGS. 2–4 differs from the remaining assemblies 45 shown in FIGS. 4a and 6 in that it has an overtravel limit cam 96b and a home sensor cam 96a and is adapted to be driven directly by a motorized gear belt drive system, as will later be more fully explained. Where as 45 is driven by a cable 108 that transverses the entire track 42 and completes a closed loop by reattaching to assembly 44. As best seen in FIG. 6, the system 84 includes an endless gear belt 86 strung between a motorized shaft 88 and a drive gear 90 driven by the drive motor 93. Located at the other end of the belt 86 is a follower gear and idler shaft 92 that holds tension on belt 86 by means of a tension spring 92a and a tension spring bolt adjuster 92b shown in FIG. 6. The system 84 is mounted on an upper surface of a plate 94 which is located within and welded to and around the interior facing broad side of the strip 50 of the enclosed track 42. See FIGS. 2–3 and 6–7. The upper carriage member 44a of the belt connected assembly 44 of FIGS. 2–4 is fastened to the belt 86 by means of a plate 96a secured to the belt and upper carriage member by suitable threaded fasteners 98. See FIGS. 3 and 7. The motor 93 can be energized to drive the assemblies 44, 45 along their preselected portion of the track 42. When the motor 93 has reached its preselected count and fails to stop at that position, an over travel microswitch 102, 103 will be engaged by the plate 96b, see FIGS. 2–3, to deactivate the motor 93 so that the over travel problem can be remedied without incurring damage to the apparatus 40, as will later be more fully explained.

The belt connected assembly 44 of FIGS. 2–4 contains a block 104 fixedly attached to the bolts 62 approximately midway between the upper and lower carriage members 44a, 44b. A pair of hollow, cylindrically shaped tubes 105, disposed over the bolts 62 between the block 104 and lower carriage member block 60, function as spacers. The block 104 includes a horizontally outwardly extending projection 106 through which one end portion 107 of a flexible cable 108 extends. A coiled spring 110 surrounds the cable end portion 107 between the projection 106 and a cable end cap 112. The cable 108 extends completely around the track 42 as shown in FIG. 6 and an opposite end portion 114 thereof connects back into a block 116 on the belt connected assembly 44 and is secured therein by means of a set screw 118 (FIGS. 3–4). The remaining assemblies 45 are connected to the cable 108 by means of a bore through the corresponding block 116a and are fastened therein with set screws 118, the same as the cable end portion 114 is connected into the belt connected assembly 44 of FIGS. 2–4. Assemblies 45 have a pair of hollow cylindrically shaped tubes 105a dispensed over the bolts 62 between the blocks 104a and the lower carriage member 60, which function as spacers.

Figure 7B:
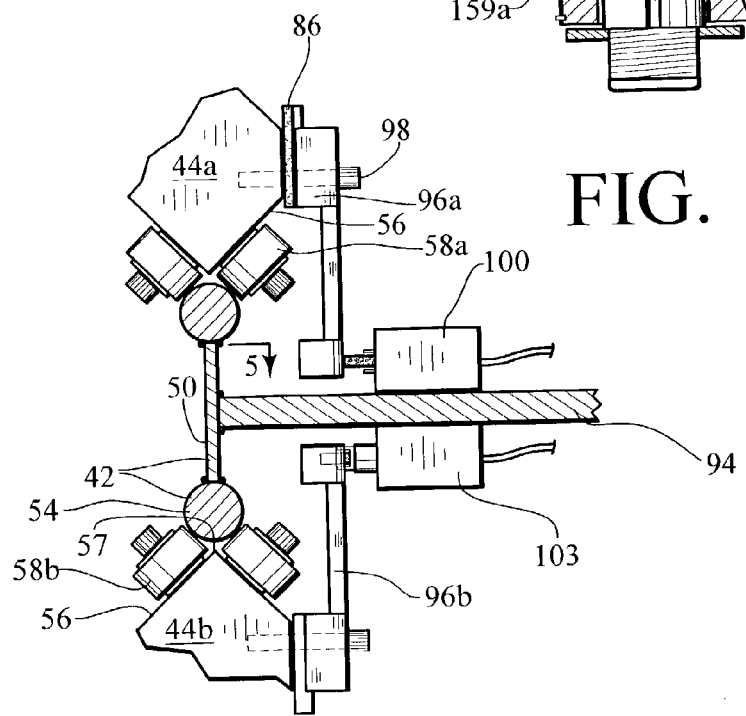
FIG. 7b shows a cross sectional view of a portion of the motorized drive unit of FIG. 7 as viewed along cross section lines 7b—7b of the latter mentioned figure.

The cable 108 is drawn sufficiently tight so that it closely, but loosely, conforms to the outside surface of the track strip 50 (FIG. 6). As shown in FIG. 7a, a strip 122 of plastic, such as Teflon, can be fastened to and around the outside corners 120 of the track strip 50 to permit the cable 108 to rub thereon as the cable and assemblies 44, 45 move along the track 42. Thus, as the belt connected assembly 44 moves along the track 42, the cable 108 moves to advance the remaining assemblies 45 equal distances along different sections of the track. At the same time, the cutting tools 46 operate to cut the desired border from the work pieces 34.

Upon completion of the border cutting operation of the apparatus 40 with the six carriage assemblies 44, 45 all moving in unison in one direction under the influence of the motorized drive belt 86 and cable 108 and, upon subsequent completion of aperture formation by the apparatus 40 one embodiment of a finished workpiece has been cut.

Figure 1A:
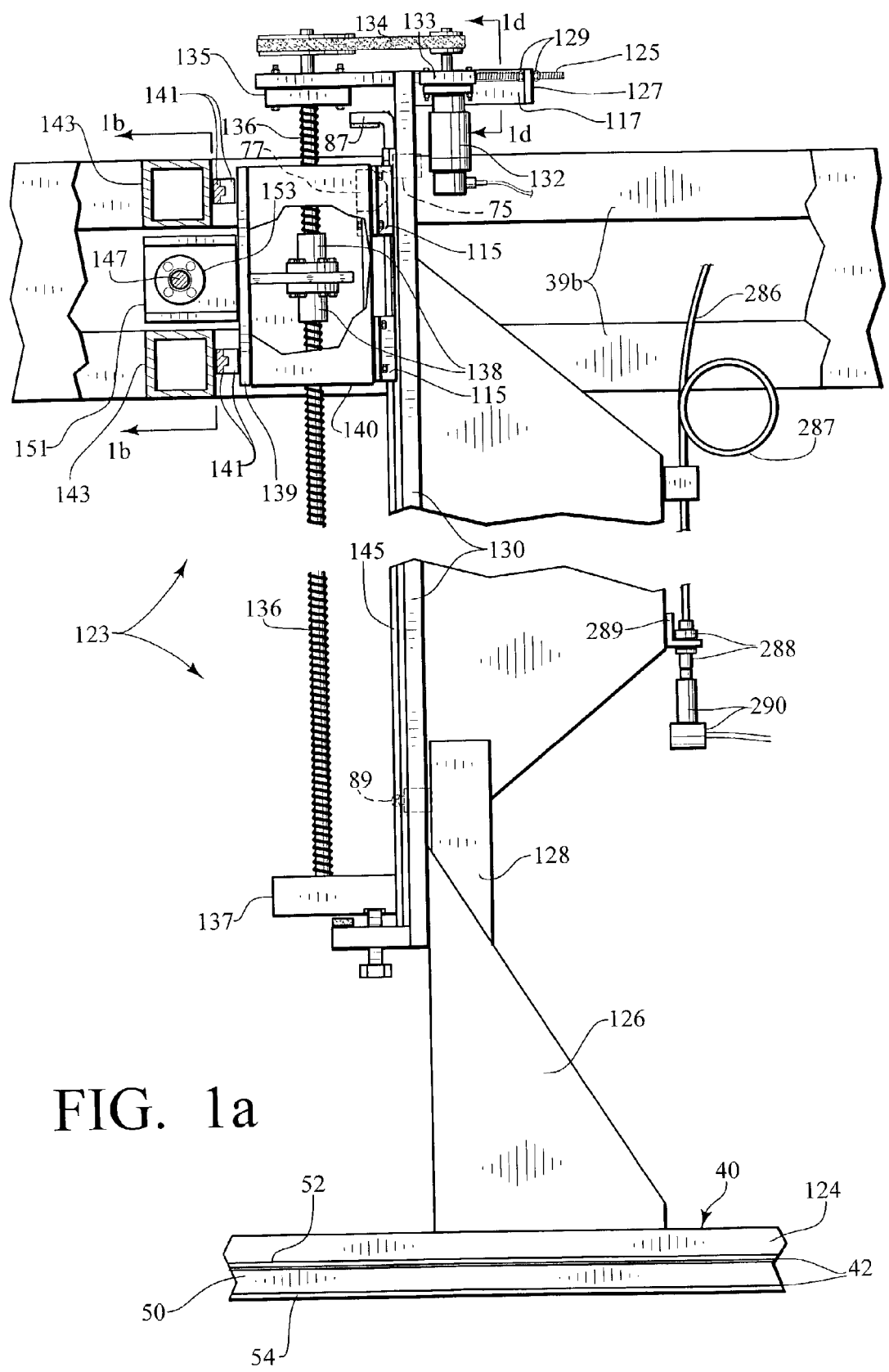
FIG. 1a shows a front elevation view of a portion of the machine of FIG. 1.
Figure 1B:
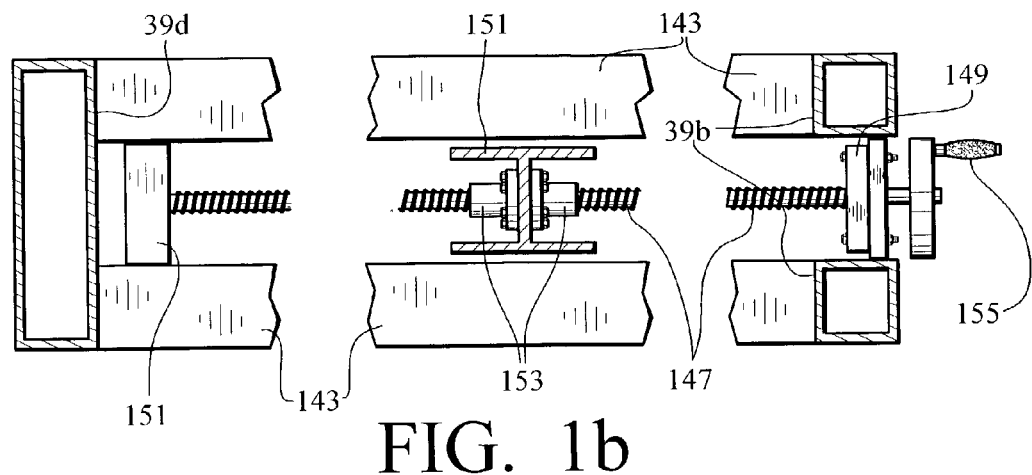
Figure 1C:
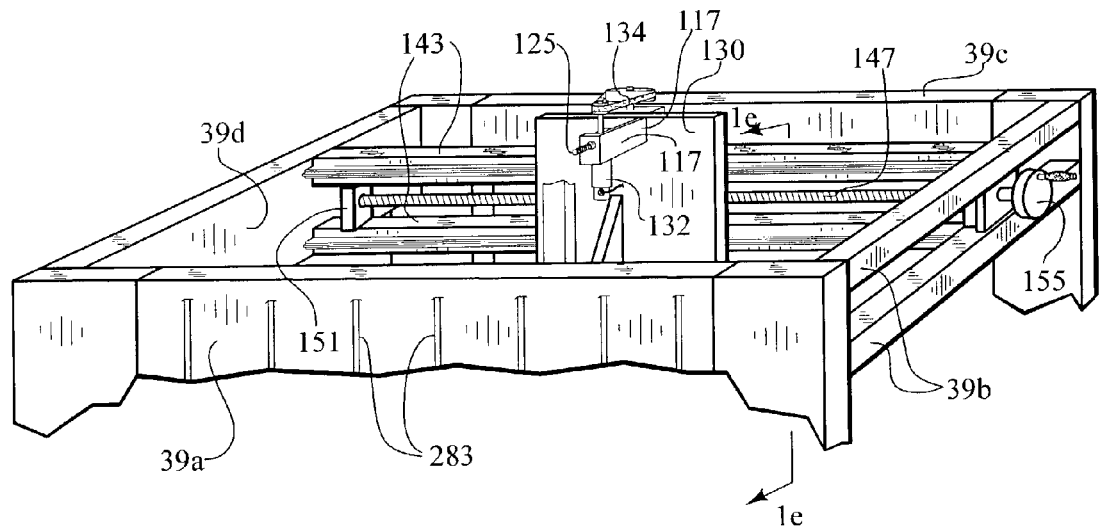
FIG. 1c shows a perspective view of an upper portion of the machine of FIG. 1 showing certain machine components also seen in FIGS. 1, 1a and 1b.
Figure 1D:
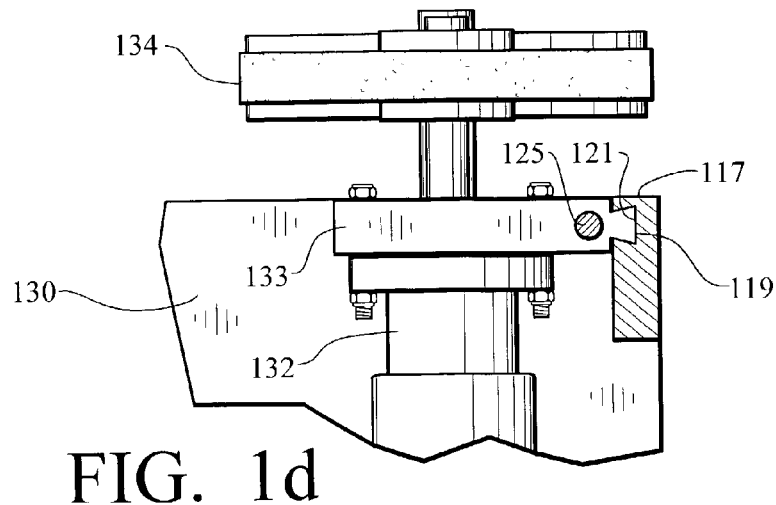
FIG. 1d shows a cross sectional view of a fragment of the machine portion of FIG. 1a as viewed along cross section lines 1d—1d of the latter mentioned figure.

Referring now to FIGS. 1, 1a–1f and 6, there is shown a mechanism, generally designated 123 (FIGS. 1a and 1e), for adjusting the height and lateral position of the cutting apparatus 40 in the machine frame 38 above, along and across the operatively positioned table 32. A pair of spaced apart, elongate rails 124 is suitably attached, as by welding, to an upper surface of the plate 94 (FIGS. 1 and 6). The rails 124 are, in turn, joined along central portions thereof to a pair of side panels 126 which are, in turn, attached to a pair of vertically extending beam members 128. The members 128 are horizontally spaced apart and bolted to opposite side edges of a broad surface of a vertically extending steel panel 130 (FIGS. 1 and 1a). A dc servo motor 132 operates an endless drive belt, as will later be more fully explained, 134 to rotate and elongate a conventional vertically extending ball screw 136 through a pair of ball nuts 138 which are fixed in height in the machine frame 38. The motor 132 is suspended from a plate 133, which is slidably attached to a mounting bracket 117. One side of the mounting bracket 117 is fixedly attached to an upper broad surface portion of the panel 130. The plate 133 contains a key 119 projecting from a rear edge thereof which slidably fits within a close conforming slot 121 which extends horizontally along a front facing surface portion of the bracket 117, as best seen in FIG. 1d. A lead screw 125 is fixedly joined on one end thereof to a side edge of the plate 133, as by means of a weld, and extends through a smooth bore in a flange 127 (FIG. 1a). A pair of hex nuts 129 is located on the lead screw 125 on opposite sides of the flange 127. By adjusting the hex nuts 129 with a wrench, the plate 133 can be moved to the right or left as viewed in FIG. 1a sufficient to loosen the drive belt 134 for removal, when necessary, and sufficient to tighten the belt for operation of the ball screw 136.

The vertical ball screw 136 is rotatably mounted between bearing plates 135, 137 which, in turn, are bolted to upper and lower end portions of the panel 130. The ball nuts 138 are fixedly mounted on a plate 139 which, in turn, is mounted on movable guide blocks of a pair of conventional horizontally extending linear rails 141, the rails being fixedly connected to a pair of standard steel box tubes 143. See FIGS. 1a and 1e. The box tubes 143 are mounted between upper beam members 39b and 39d of the machine housing 38 (FIG. 1c). Thus, the ball nuts 138 are fixed in height such that the vertical ball screw 136 moves upwardly and downwardly through the same as the ball screw is rotated by the motor 132. Such movement of the ball screw 136 lifts and lowers the panel 130 along a pair of vertically extending, horizontally spaced apart linear rails 145, which is attached to the panel 130. The guide blocks of the linear rails 141 are fixedly connected to the plate 139 to which the ball nut housing 140 is also connected. See particularly FIG. 1e. The opposite side of the housing 140 is attached to guide blocks 115 which are slidably mounted on the rails 145. Accordingly, by reversing the polarity of the electrical power source of the motor 132, the panel 130, members 128, side panels 126 and the entire cutting apparatus 40 can be raised or lowered above the operatively positioned table 32 as the rails 145 move up or down through the stationary guide blocks 115.

In FIG. 1a the apparatus 40 is shown at a lower end of its vertical travel which is determined by a preselected number of revolutions and fractions of revolutions of the servo motor 132, as will later be more fully explained. Should the servo motor 132 fail to stop upon reaching the selected revolutions count, indicative of the apparatus 40 being at the programmed low point, a slight further downward movement of the panel 130 will cause an over travel microswitch 75, affixed to a side edge of the panel, to engage a microswitch cam block 77 attached to an angle bracket 85 which is, in turn, secured to a forwardly facing side of the housing 140. See particularly, FIGS. 1a, 1e, and 1f. Now, should activation of the over travel microswitch 75 fail to cause the PLC 304 to shut down the motor 132, a further downward movement of the panel 130 will cause a flexible resilient pad on a stop bracket 87 to engage an upper edge of the housing 140 to prevent further downward movement of the panel and the apparatus 40.

The same type arrangement effects maximum upward movement of the apparatus 40 and panel 130. In this case, the polarity of the motor 132 is reversed to reverse rotation thereof to raise the panel 130 to either the zero set point or home position wherein a home position microswitch 89 (FIG. 1e) is activated by a diagonally extending surface 91 (FIG. 1F) of the cam block 77. But, should the motor 132 continue to run past the home position, a slight further raising of the panel 130 will cause another diagonally extending surface 97 of the cam block 77 to engage an over travel switch 99 mounted on a lower edge portion of the panel adjacent to the home position switch 89. Engagement of the switch 99 by the cam block 77 should cause the PLC 304 to de-energize the motor 132. Failing this, however, a flexible resilient pad 109 mounted on an upper surface of plate 111 will ultimately engage a lower edge of the housing 140 to interfere with further upward movement of the panel 130 and the apparatus 40. Under the latter circumstances, bearing plate 137 is sized to move upwardly into a base portion of the housing 140 to permit the pad 111 to engage a lower edge of the housing as shown best in FIG. 1e.

The cutting apparatus 40 also can be adjusted in horizontal position along the table 32, as desired, in the following manner. A horizontal ball screw 147 is rotatably mounted between a pair of blocks 149, 151 (FIG. 1b) which are trapped between upper and lower box tubes 143. The ball screw 147 extends through a pair of ball nuts 153, the latter being fixedly connected to an H beam member 151 which, in turn, is welded to the plate 139 (FIG. 1a). A handle 155 allows the ball screw 147 to be manually rotated to move the ball nuts 153 back and forth thereon to, in turn, move the plate 139, housing 140, panel 130 and cutting apparatus 40, to a selected position horizontally along and over the table 32. This adjustment permits movement of the apparatus 40 rearwardly in the frame to permit changes in tooling when necessary. The table 32 can also be adjusted in position on its linear movable rails 36 (FIGS. 14–15) from a workpiece loading/unloading position in front of the machine frame 38 to an operative position within the frame and under the border and aperture cutting apparatus 40 as later more fully explained.

Figure 9A:
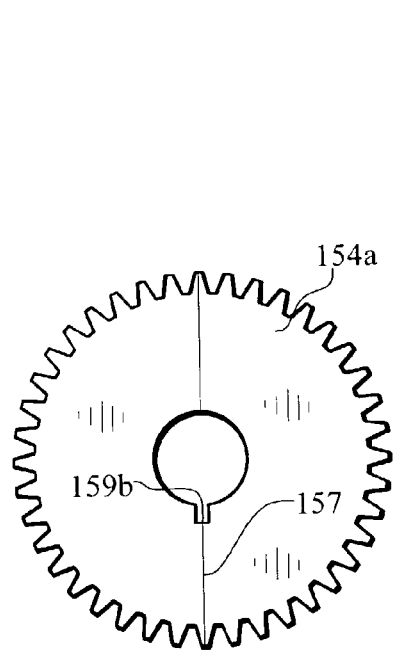
FIG. 9a shows a plan view of one of a pair of follower gears shown in the assembly of FIGS. 8–9.
Figure 9B:
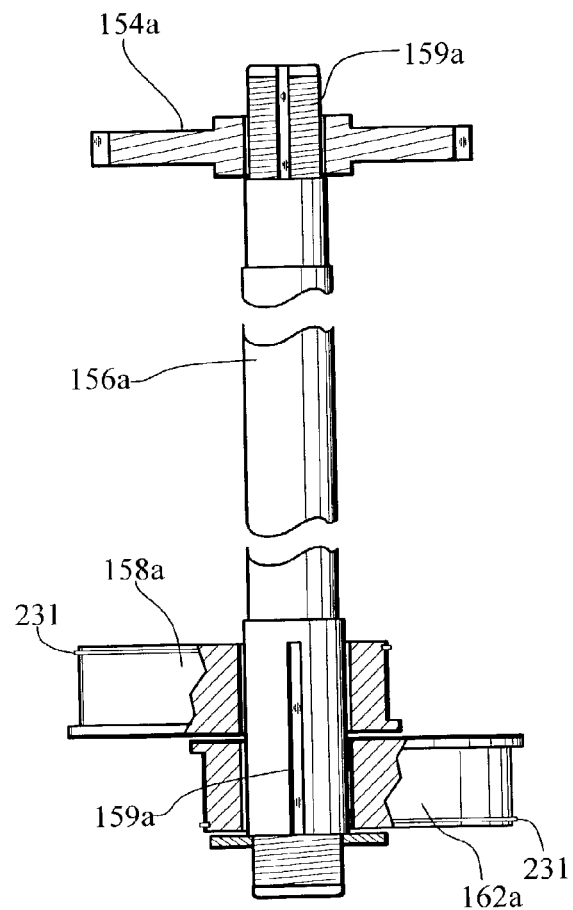

Referring now to FIGS. 6 and 8–11 there is shown, in a preferred embodiment of the invention, a high pressure water jet aperture cutting device, generally designated 142. The device 142, when mounted on the plate 94 as shown in FIG. 6, forms a part of the cutting apparatus 40 as previously mentioned. The device 142 includes a housing or frame 144 mounted over an opening 131 (FIG. 8) formed in the plate 94 between panels 126. An electric drive motor 146 mounted over the center of an upper cover plate 148 is operatively connected to a rotary gear drive assembly located within the frame 144. How the electrical drive motor is driven will be later more fully explained. The gear drive assembly includes a rotary drive shaft 150 and a drive gear 152 mounted on a central portion of the drive shaft for rotation therewith. A pair of follower gears 154a,b responsively engage the drive gear 152 on opposite sides of the latter. A pair of rotary cam shafts 156a,b are responsively connected to the follower gears 154a,b and are operatively connected to a first pair of circular cams 158a,b rotatably mounted in a first plate 160, and to a second pair of circular cams 162a,b rotatably mounted in a second plate 164. The cam pairs 158a,b and 162a,b are eccentrically mounted on the cam shafts 156a,b for rotation therewith and the plates 160, 164 are disposed parallel and next to one another below the plate 94 and below a lower cover plate 166 of the frame 144. The drive shaft 150 contains a conventional bevel bearing 168 rotatably mounted on a central portion thereof which is seated in a bevel bearing race 170 located in a central plate 172 of the frame 144 just below the drive gear 152. A similar bevel bearing 174 is rotatably mounted on a lower end of the drive shaft 150 for rotation in a bearing race 176 located in the lower cover plate 166. Likewise, the cam shafts 156a, b each have a pair of bevel bearings 178 mounted for rotation in bevel bearing races 180 located in the central plate 172 and the lower frame cover plate 166. The cams 158a, b and 162a,b are placed in ball bearings 182 and secured in place with lock rings 231 fitted into grooves formed in the perimeters of the cams. See FIG. 9b. As the cams 158a,b and 162a,b rotate in annularly shaped ball bearings 182 (FIG. 8) in the plates 160, 164, the plates wobble in a circular pattern in their horizontal planes but maintain their orientation due to the fixed alignment of the cam shafts 156a,b relative to each other.

Figure 8:
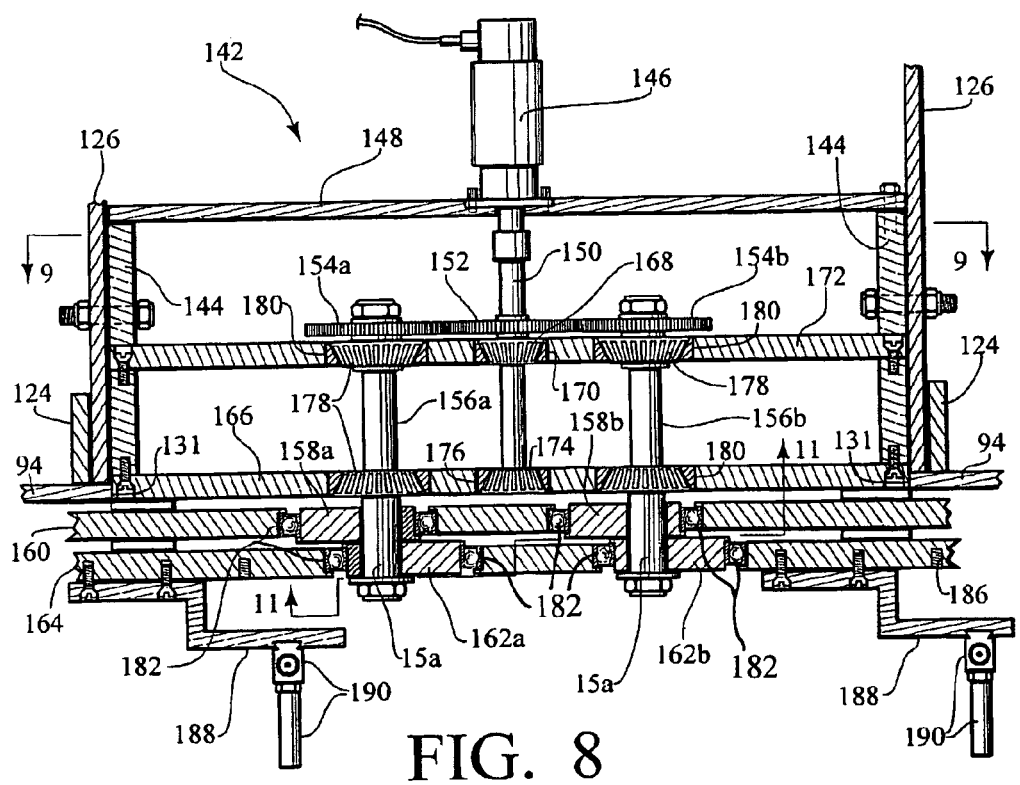
FIG. 8 shows a cross-section view of a cam operated water jet hole cutting assembly of the machine of FIG. 1 as viewed along cross section lines 8—8 of FIG. 6.
Figure 9:
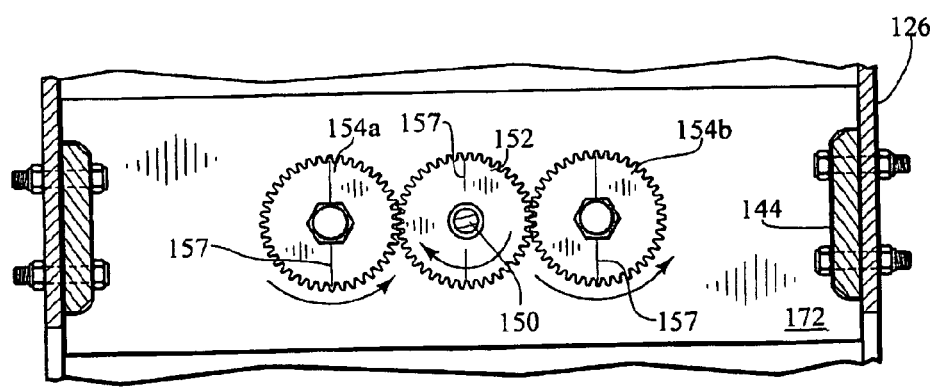
FIG. 9 shows a cross section view of the assembly of FIG. 8 as viewed along cross section lines 9—9 of the latter mentioned figure with missing parts of FIG. 8 being replaced.
Figure 10:
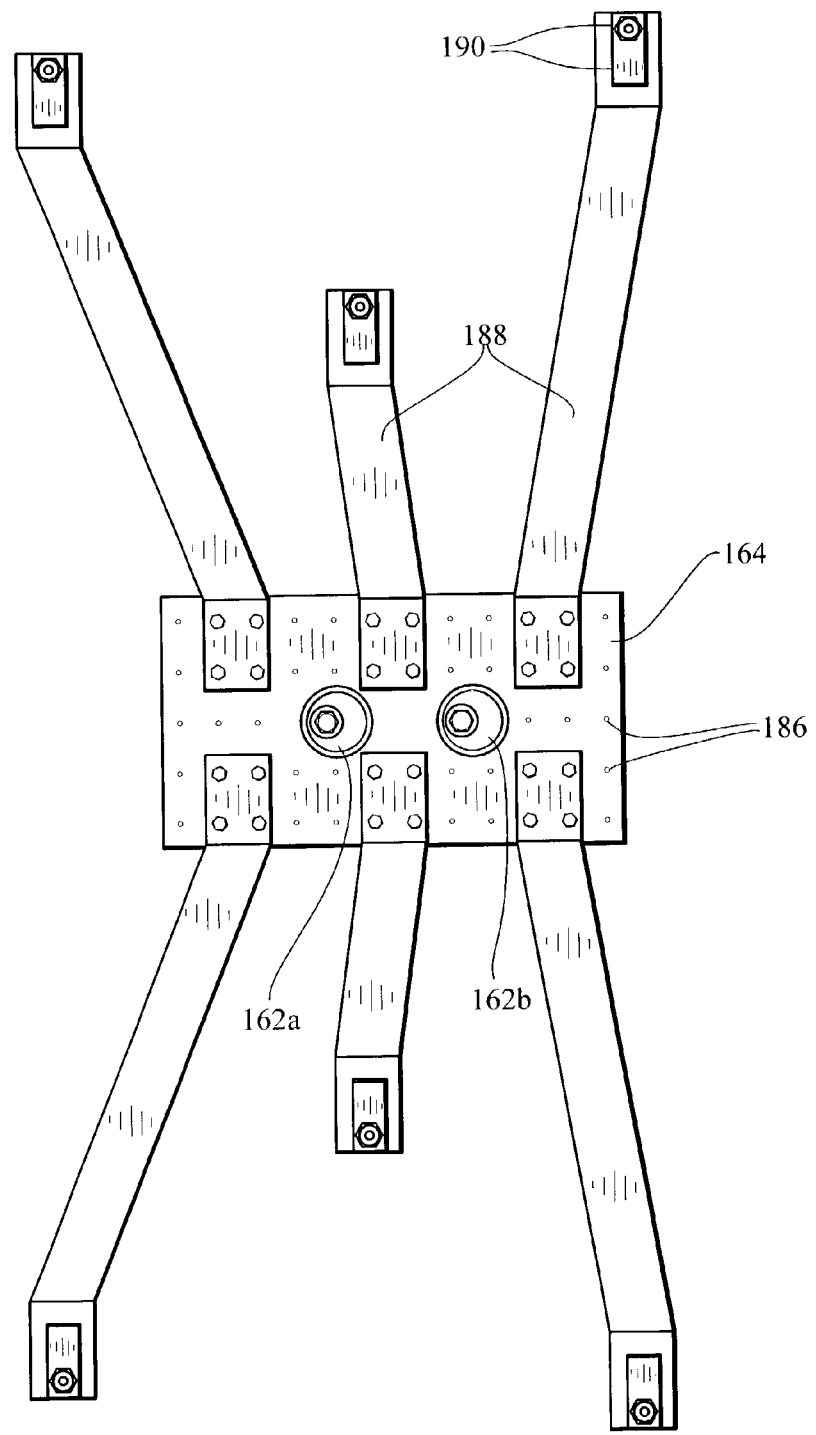
FIG. 10 shows a bottom plan view of the assembly of FIGS. 8–9.

As shown in FIGS. 8 and 11, the long radii of the first cam pair 158a,b always extend in the same horizontal direction. Likewise, the long radii of the second cam pair 162a,b always extend in the same direction relative to one another, which is precisely opposite the direction of extension of the long radii of the first cam pair 158a,b. In other words, the cam pair 158a,b is precisely 180 degrees out of phase with the cam pair 162a,b. The gears 152 and 154a,b can include index lines 157 which, when aligned, assure that the cams 158a,b and 162a,b are precisely positioned relative to one another when keys 159a are precisely positioned relative to one another when fitted in keyways 159b. See also FIGS. 9, 9a and 9b. As a result, the circular wobbling motion of the first plate 160 counterbalances the circular wobbling motion of the second plate 164 as movement of the two plates occurs, as indicated by arrows 184 in FIGS. 11b–11h, over one complete cycle of rotation of the first and second cam pairs 158a,b and 162a,b respectively. The bottom or second plate 164 may contain an array of threaded blind holes 186 (FIG. 10) for fastening the ends of one or more arms 188 thereto with suitable fasteners. The arms 188 each carry a high pressure water jet cutting tool 190 on a free end thereof. The length and longitudinal direction of each of the arms 188 is selected for placement of a corresponding tool over the precise position on one of the workpieces 34 wherein an opening is to be cut. As the plate 164 wobbles in a circular pattern, the tools 190 can be activated to cut holes through the workpieces 34 at the desired locations.

Referring now to FIGS. 19–23, another important embodiment of a water jet border cutting apparatus, generally designated 192, which can be used in the machine 30 of FIG. 1 in place of the previously explained apparatus 40, is shown. The apparatus 192 includes an endless monorail track 194 which contains an elongate, thin steel strip 196 with attached upper and lower, longitudinally extending roller bearing surfaces 198, 200, respectively, the same as at 52, 54 on the track 42 of the apparatus 40. The track 194 of the present example is shown as being generally rectangular in shape for illustrative purposes only, but can be formed so as to follow any reasonable desired course in a single plane. The track 194 also includes a conventional flexible gear belt 202 which is suitably connected along and around an outside broad surface of the strip 196. See FIG. 19. A single water jet carriage assembly 204, having upper and lower carriage members 206, 208 rollably mounted over and under the upper and lower roller bearing surfaces 198, 200, respectively, is shown on the track 194. The upper and lower carriage members 206, 208 may be identical to the members 45a, 45b of the carriage assembly 45 of FIG. 4a in both structure and function and need differ only from the latter mentioned assembly in the manner in which 206 has a servo motor attachment bracket 223.

In the present example, the upper and lower members 206, 208 are joined together by a single bolt 210. A lower end portion of the bolt 210 may be threadably joined to an interiorly threaded blind bore 223 extending downwardly through a block 212 on the lower carriage member 208. The remainder of the bolt 210 is smooth and unthreaded and extends vertically upwardly from the block 212 through a smooth bore 225 in the upper carriage member 206 and further upwardly beyond an upper surface 214 of the upper member. A coiled spring 216 surrounds an upper end portion of the bolt 210 and is trapped in compression between a bolt head 218 and the upper surface 214. A follower gear 220 is mounted on the bolt 210 between the upper and lower members 206, 208 so as to engage the teeth of the belt gear 202 of the track 194. A reversible D.C. Electric Servo-drive Motor 222 is suitably attached to an outwardly facing surface (relative to the track 194) of the upper carriage member 206 and contains a driven gear 224 mounted on a lower end of a drive shaft of the motor which operatively engages the follower gear 220. Upon activation of the motor 222, the gears 220, 224 are operated to move the gear 220 along the gear belt 202 and thus drive the carriage assembly 204 along the track 194. By reversing the polarity of the electrical power source applied to the motor 222, the direction of movement of the members 206, 208 along the track 194 can be reversed. As in the previous example of the apparatus 40, the same aperture cutting device 142 as previously discussed can be mounted over an opening in a plate 226 welded to and around an interior facing surface of the track strip 196, see FIG. 19.

Figures 19, 20:
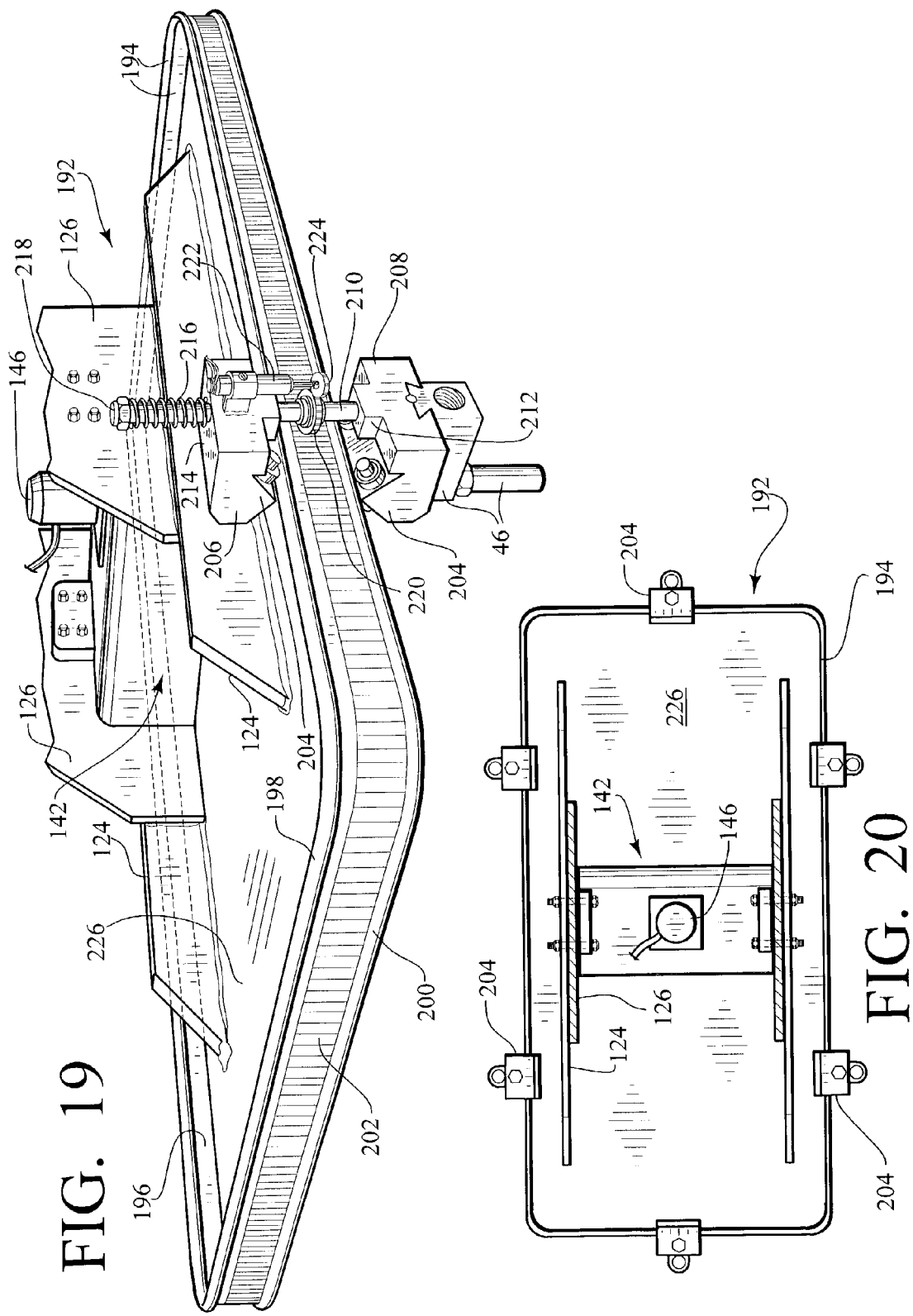
FIG. 19 shows a perspective view of an alternative monorail track and water jet carriage assembly for the machine of FIG. 1.
FIG. 20 shows a top plan view of the monorail track of FIG. 19 except containing several water jet carriages of the type shown in the latter mentioned figure.
Figure 24:
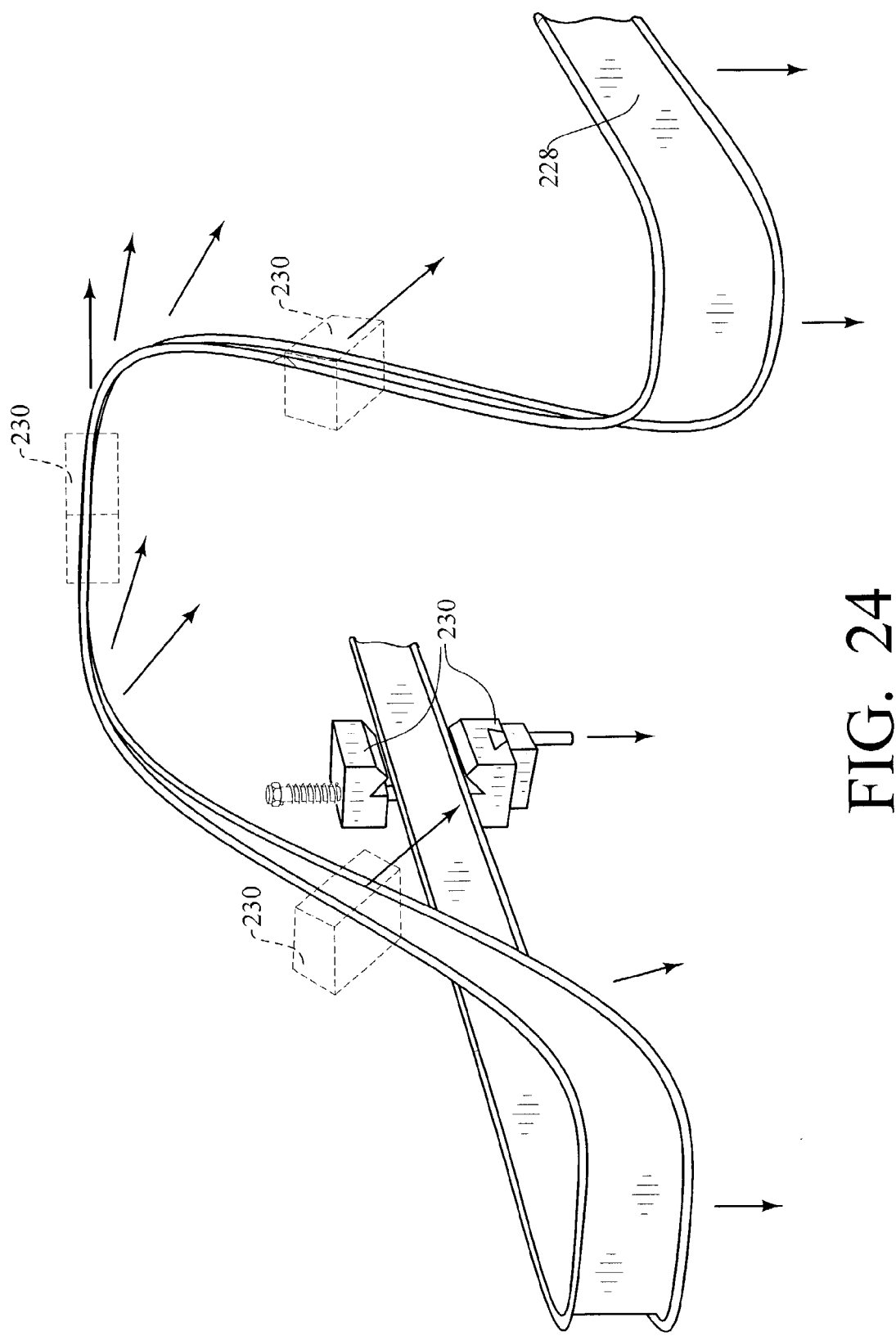
FIG. 24 shows a perspective view of a water jet carriage of the same type as shown in FIGS. 19–23 disposed on a monorail track having a twisted or tortuous path for operating on a three dimensional work piece.

The apparatus 192, with the device 142 attached, if desired, can then be mounted between the rails 124 and end plates 126 of the machine 30, the same as previously explained and as also shown in FIG. 19. Also, as in the previous example, a water jet cutting tool 46 can be attached to the lower carriage member 208 for cutting the border, or a portion thereof, if more than one such border cutting assembly is to be employed. FIG. 20 shows a series of six water jet carriage assemblies 204, each of which moves along a different portion of the track 194 to reduce the time required to make a workpiece border cut as compared with the single assembly 204 shown in FIG. 19, which must travel the entire length of the track to complete a border. The carriage assembly 204, with the single bolt 210 connecting the upper and lower members 206, 208 together, can also be used on a monorail track 228 which follows a twisting path in three dimensions as illustrated in exaggerated form in FIG. 24. The track 228 is of the same type as the track 194 described in the previous example of FIGS. 19–23 and would include a belt gear, not shown, around its perimeter, the same as at 202 in FIG. 19. But, in the example of FIG. 24, the track 228 can be formed such that a water jet carrier assembly 230 traveling thereon can cut the border of a three dimensional workpiece, the assembly 230 being identical to the assembly 204 in FIG. 19.

Figure 25:
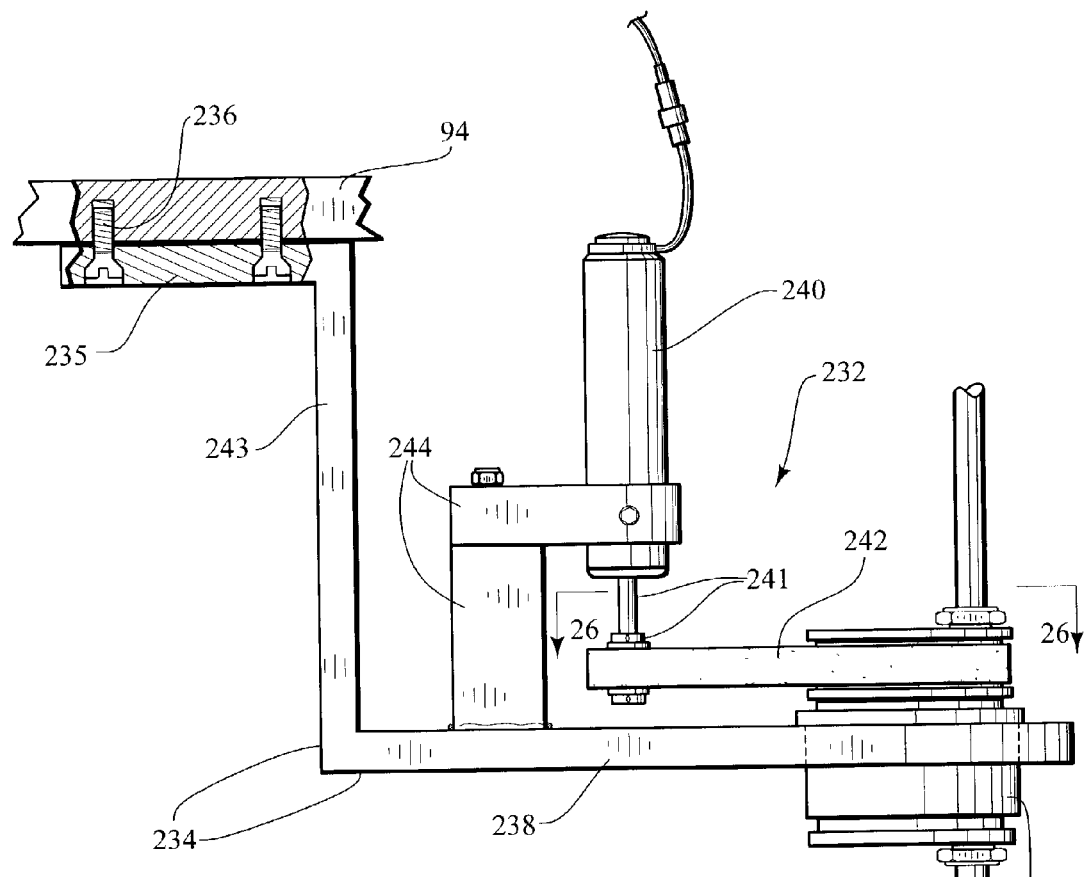
FIG. 25 shows a side elevation view of a portion of an arm carrying a cam operated, movable, water jet cutter as an alternative to the cam operated double plate arrangement of FIGS. 8–11.
Figure 26:
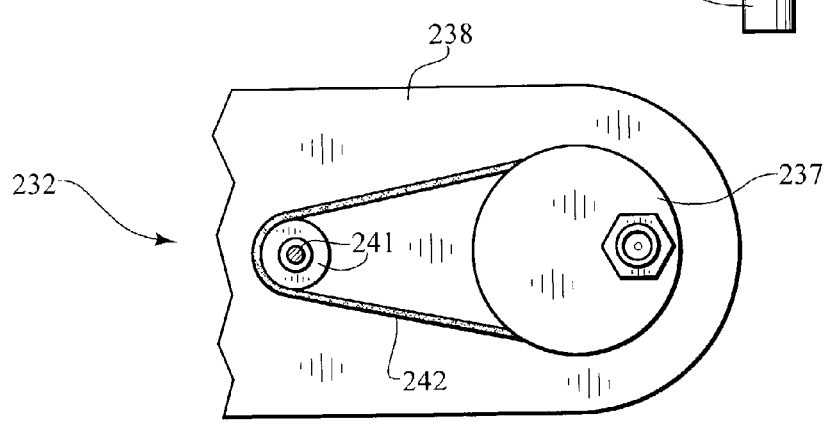
FIG. 26 shows a cross sectional top plan view of the arm of FIG. 25 as viewed along cross section lines 26—26 of the latter mentioned figure.

Referring now to FIGS. 25–26, there is shown another important embodiment of a water jet aperture cutting device of the present invention, generally designated 232, including an arm 234, which may be suitably shaped for clearance purposes and which may be attached on one end portion 235 to the plate 94 of the apparatus 40 of FIG. 6, for example, by threaded fasteners 236. The device 232 further includes a circular rotary cam 237 mounted in a free end portion 238 of the arm 234. The cam 237 includes a water jet nozzle 239 which is eccentrically mounted on the cam 237 for rotation about a vertical axial centerline of the cam as the latter rotates in the arm end portion 238. The device 232 also includes an electric servo drive motor 240 mounted on the end portion 238 which includes a drive 241 for a belt 242, which belt, in turn, is connected to rotate the cam 237 when the motor is energized. The arm 234 may have a vertically extending central portion 243 which provides the necessary clearance for the motor 240 and its mount 244 between the bottom of the plate 94 and the arm end portion 238. Any number of arm arrangements, such as at 234, can be fastened to the plate 94 to extend in a desired direction over a selected distance to place the axial centerline of the corresponding cam 237 over the precise position of the workpiece 34 (FIG. 1) to cut an opening around that position. The aperture cutting device 232 is an alternative to the device 142 of FIGS. 6 and 8–11. The cam 237 can readily be removed and replaced such that the cutting radius of the nozzle assembly 239 can be changed in order to cut different size holes in the workpiece 34.

Figure 27:
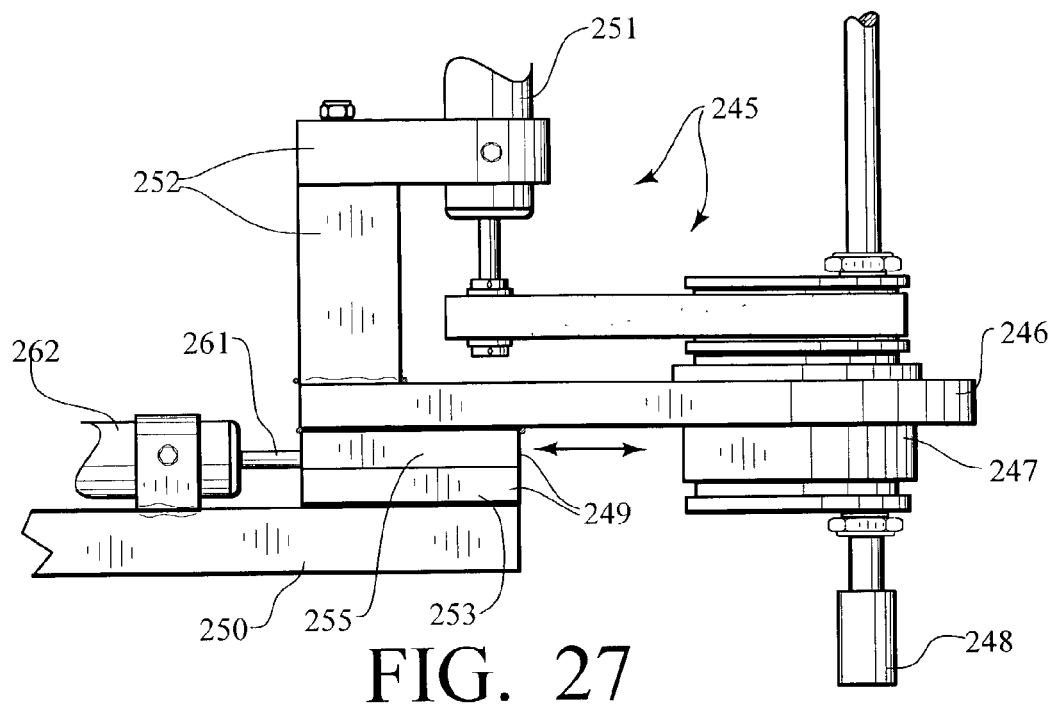
FIG. 27 shows a side elevation view of an arm containing a cam operated movable water jet cutter and having a servo-mechanism operated linear movement of the arm.
Figure 28:
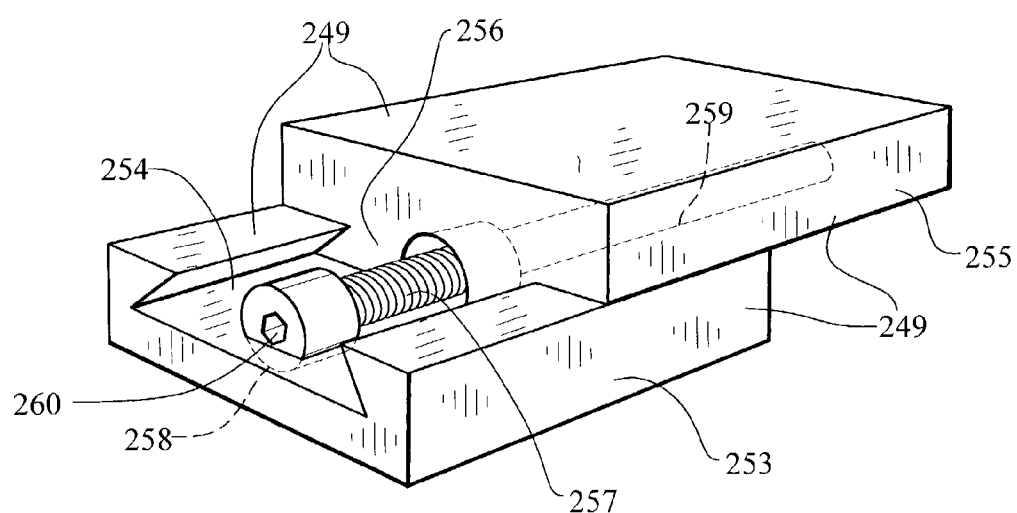
FIG. 28 shows a perspective view of a pair of slidably engaging plates as shown in FIG. 27.

Referring now to FIGS. 27–28 there is shown, an aperture cutting device 245, the same as in the preceding example of FIGS. 25–26 except that, here, an arm 246 containing a rotary cam 247 with eccentrically mounted water jet nozzle assembly 248, is mounted on a linear adjustment block 249 which is, in turn, suitably mounted on an arm 250. As in the previous example, the arm 250 may be suitably attached to the plate 94 of FIG. 6 or it could be attached to the plate 226 of apparatus 192 of FIG. 19. As before, clearance must be provided for a servo drive motor 251 and motor mount 252 between the arm 246 and the plate 94 of FIG. 6 or 226 of FIG. 19, as the case may be. The block 249 includes a lower plate 253, which is fixedly mounted on the arm 250 and defines a recessed, upwardly opening keyway 254 in an upper surface portion thereof. The block 249 further includes an upper plate 255 defining a downwardly projecting key 256 on a lower surface thereof, which closely and slidably fits within the keyway 254 of the lower plate 253. The arm 246 is mounted on a proximal end portion thereof to an upper surface of the upper plate 255 such that a distal end of the arm containing the cam 246 projects outwardly beyond the arm 250. A threaded screw 257 is mounted in a slot 258 formed in the lower plate 253 and extends into a threaded shaft 259 formed in a base portion of the key 256. The screw 257 contains a hex head 260, into which a hex shaped drive rod 261 of a D.C. Servo Drive Motor 262 attaches. Upon activation of the drive motor 262, the drive rod 261 rotates to cause the screw 257 to turn in the threaded shaft 259 to, in turn, cause the upper plate 255 to slide along the keyway 254 of the lower plate 253. Linear movement of the plate 255 over the plate 253 effectively causes the arm 246 to extend, to the right as viewed in FIG. 27, or retract, to the left as viewed, depending on the polarity of the electrical power source applied to the servo drive motor 262. As a result of linear movement of the arm 246 while the cam 247 is rotating and while the water jet nozzle assembly 248 is activated, the device 245 can be used to cut elongate slots in the workpiece 34.

Figure 14:
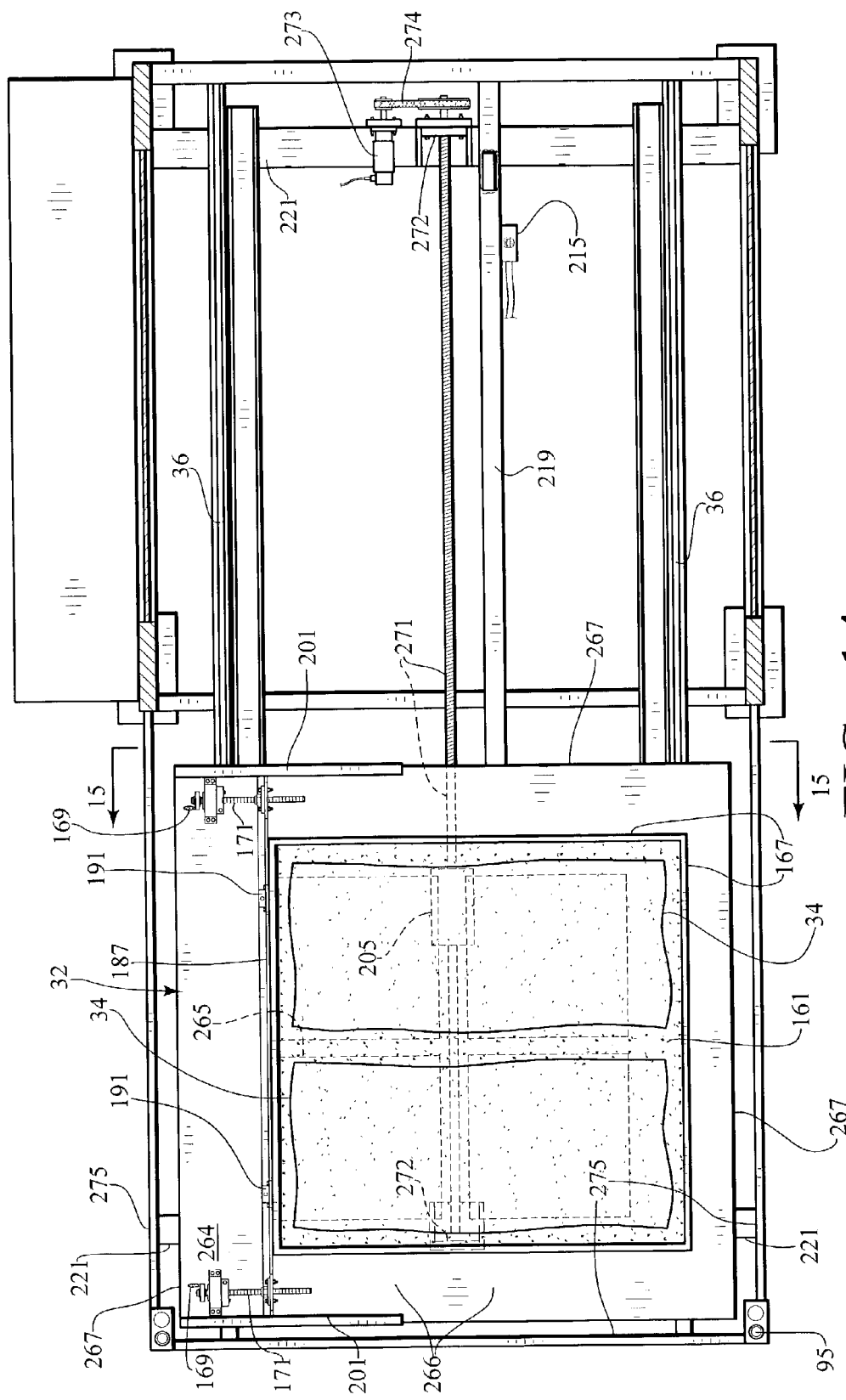
FIG. 14 shows a cross sectional view of a movable work piece support table assembly of the machine of FIG. 1 as viewed along cross section lines 14—14 of the latter mentioned figure.
Figure 15:
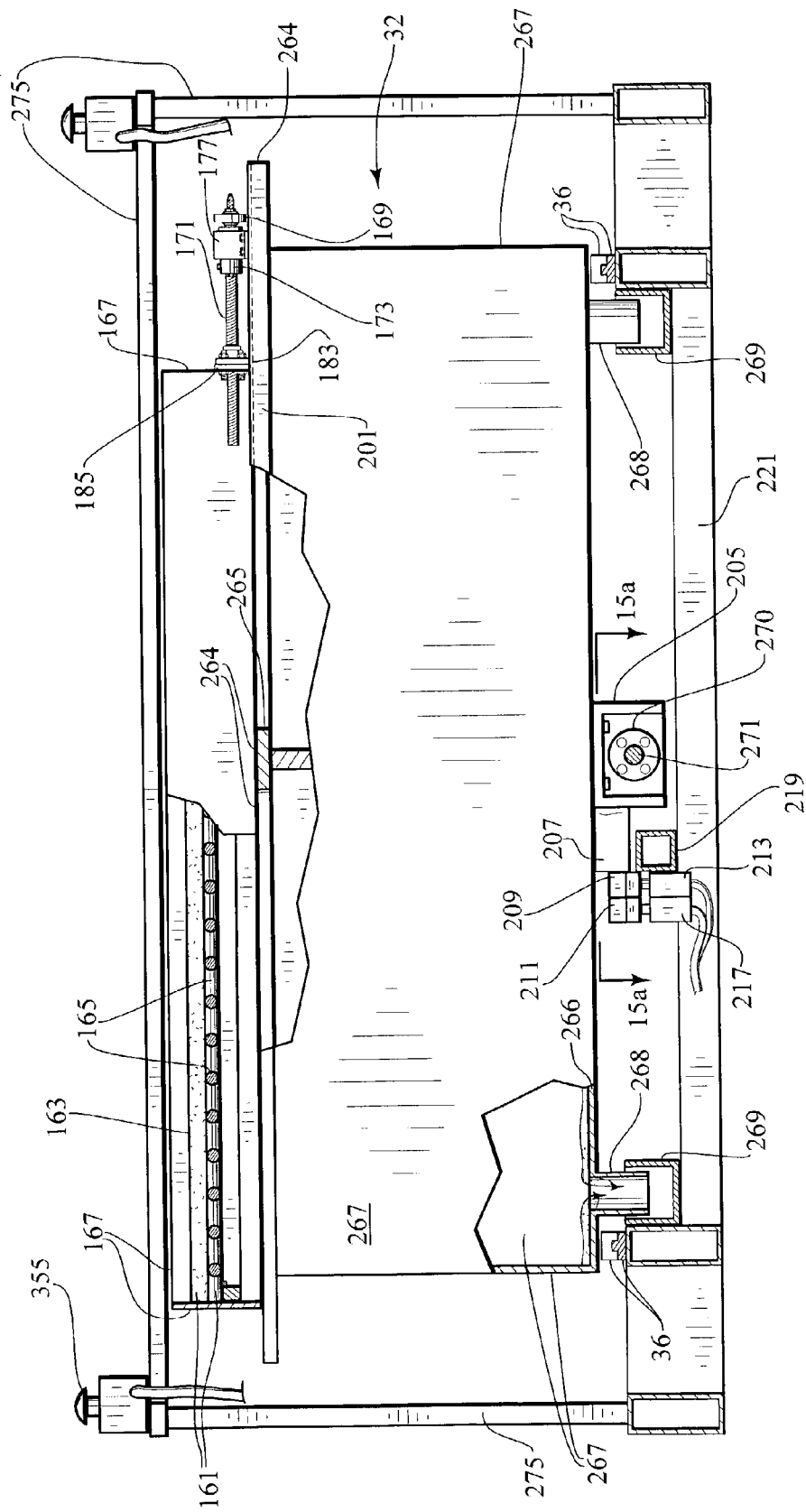
FIG. 15 shows a cross sectioned elevation view of the support table of FIG. 14 as viewed along cross section lines 15—15 of the latter mentioned figure.

Referring now to FIGS. 14–17, the support table 32 of the machine 30 of FIG. 1 for supporting the work pieces 34 is shown. The table 32 includes an upper plate 264 containing perforations 265, a lower plate 266 and vertically extending front, rear and side plates 267. The table 32 is mounted for longitudinal sliding movement into and out of the machine frame 38 on standard guide blocks slidably attached to a pair of conventional linear rails, both blocks and rails being shown at, 36 (FIG. 15). The lower plate 266 contains water drain tubes 268, which project downwardly into drain channels 269 disposed alongside the rails 36 for collection of water falling on the lower plate 266 through the perforations 265 resulting from cutting operations. A pair of lead screw ball nuts 270 located in housing 205 is attached to a lower surface of the lower plate 266 and moves along an elongated lead screw 271 which, in turn, is rotatably mounted between blocks 272. See FIGS. 14, 15, and 15a. The lead screw 271 is rotated by a D.C. Servo Drive Motor 273 and belt drive 274 to move the ball nuts 270 and, thereby, move the table 32 into or out of the frame 38 along the rails 36, depending upon the polarity of the power source applied to the motor. A fence or frame 275 surrounds the table 32 when the latter is in its loading/unloading position exterior to the machine frame 38 as shown in FIGS. 1 and 14–15.

Figure 14A:
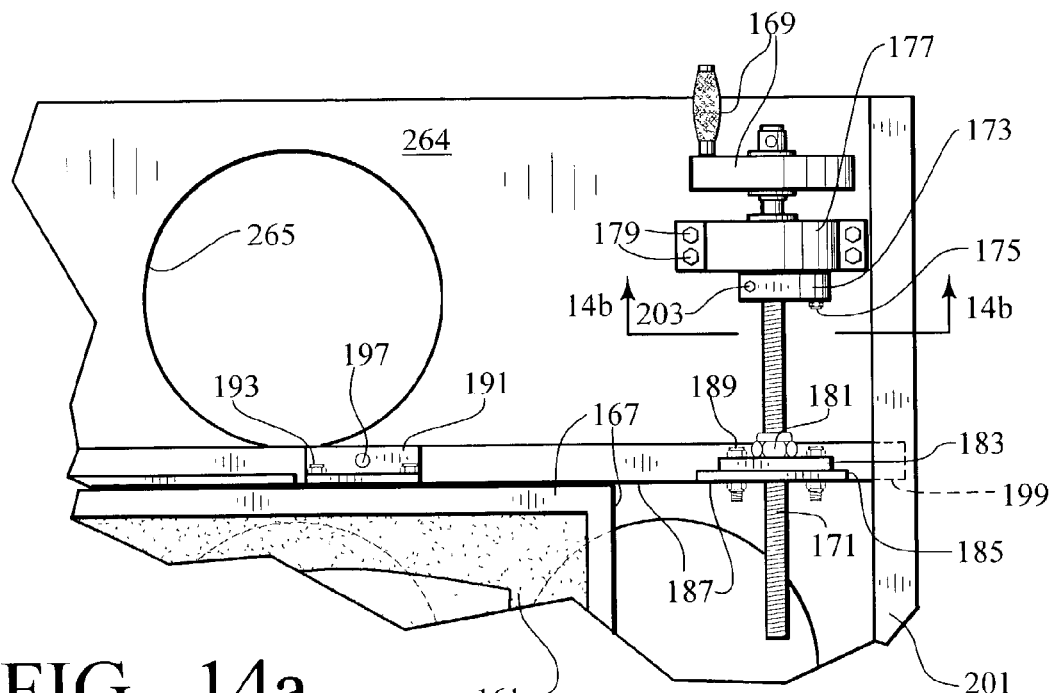
FIG. 14a shows an enlarged detail view of a portion of the support table assembly of FIG. 14, the same as viewed in the latter mentioned figure.
Figure 14B:
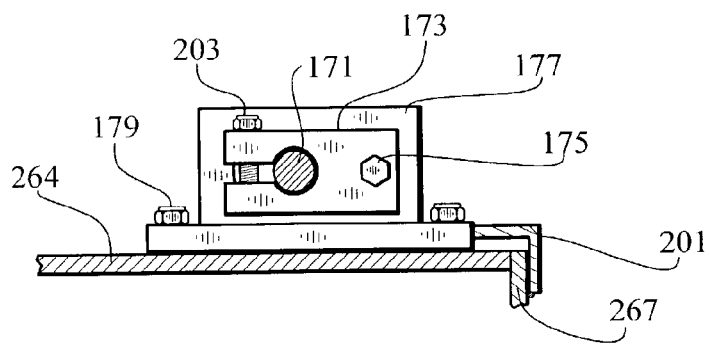
FIG. 14b shows a cross-sectional view of a portion of the support table assembly of FIGS. 14 and 14a as viewed along cross-section lines 14b—14b of the latter mentioned figure.

A standard rectangularly shaped water jet cutting board or substrate 161, which conventionally includes a molded fiberglass plate 163 having a mesh of right angle intersecting steel rods 165 embedded in a base portion thereof, is disposed on and within a cutting frame 167, which frame is disposed on the perforated upper plate 264. See FIG. 15. The frame 167, including the substrate 161, can be adjusted transversely across the upper plate 264 by manual adjustment of a pair of rotatable handles 169 to, in turn, rotate a pair of elongate lead screws 171 as is fully shown in FIG. 14. Since both handles 169 and their corresponding lead screws 171 operate identically, only the handle and corresponding lead screw located near a left rear corner of the cutting frame 167 need be shown in detail, as in FIGS. 14a, 14b, to which reference is now made. The lead screw 171 extends through a block 173, which is bolted, as at 175 (FIG. 14b), to block 177. The block 177 is fastened to the upper plate 264 by means of bolts 179.

Figure 14C:
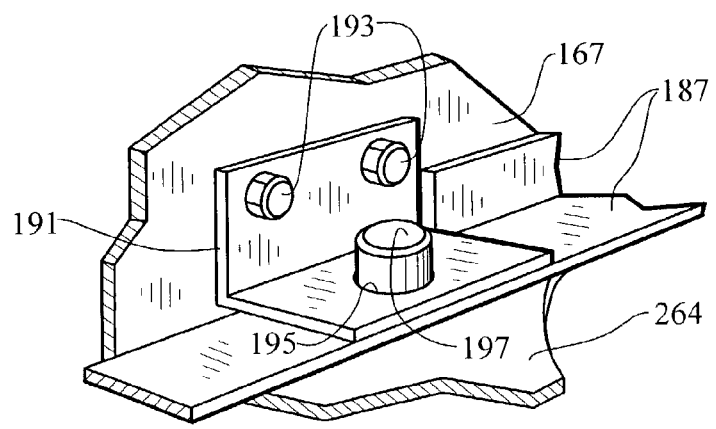

The lead screw 171 extends from the handle 169 through the blocks 177 and 173, thence through a hex nut 181, a plate 183 and an upright portion 185 of an angle iron 187. The hex nut 181 is fixedly attached to the plate 183, as by being welded thereto. The plate 183 is removably attached to the angle iron upright portion 185, as by means of bolts 189. While the hex nut 181 is threaded to conform to the threads of the lead screw 171, the plate 183 and the upright member 185 contain smooth oversize bores, in registry with one another, through which the lead screw extends. A pair of spaced apart angle brackets 191 is removably attached to the side of the cutting frame 167, which opposes the angle iron 187 by means of bolts 193. See FIGS. 14 and 14b. A horizontally extending portion of each of the angle brackets 191 contains a circular opening 195 thereon (FIG. 14c). The brackets 191 are spaced apart along the side of the frame 167 so that the openings 195 will fit over a pair of raised cylindrically shaped locator tabs 197 mounted on an upper horizontally extending surface of the angle iron 187. A horizontally extending end portion 199 of the angle iron 187 extends under an angle iron 201, which is, in turn, welded to a side panel 267 of the table 32.

Note that end portions of the upright part of the angle iron 187 have been removed to permit them to fit under the angle irons 201 at left front and left rear corner portions of the table 32. Note also that intermediate portions of the upright part of the angle iron 187, between the blocks 183 and opposite sides of the nearest angle brackets 191 have been removed to allow the angle brackets attached to the cutting frame 167 to be properly aligned with the locator tabs 197 when placing the cutting frame on the table 32. Once the handles 169 have been rotated to place the cutting frame 167 in the desired position on the table 32, a bolt 203 on the block 173 can be tightened down to fix the lead screw 171 and, consequently, the angle iron 187 and cutting frame 167 so that further inadvertent transverse movement of the frame cannot occur.

Figure 16:
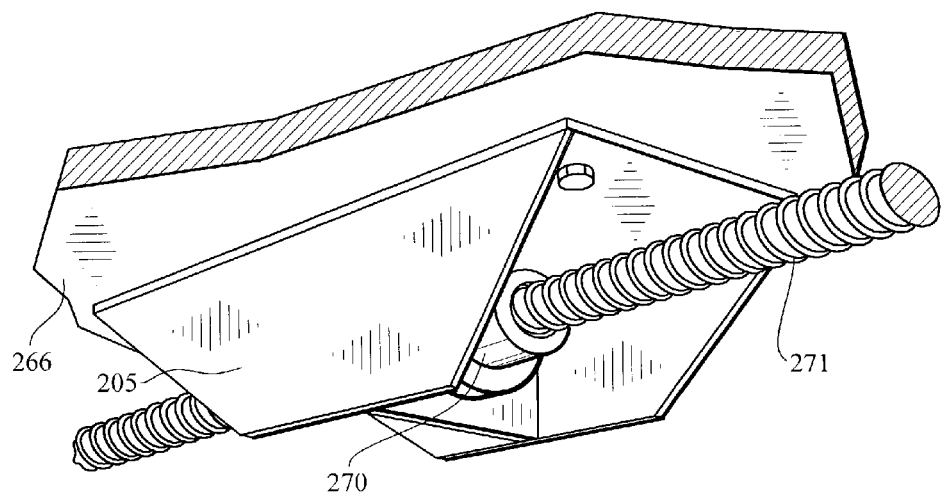
FIGS. 16–17 show a perspective view and a side elevation view, respectively, of a fragment of the machine table of FIG. 14.
Figure 17:
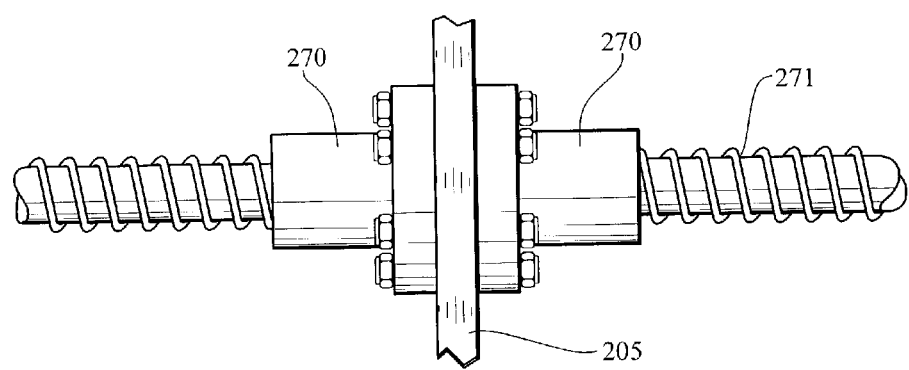

The longitudinal movement of the table 32 into and out of the machine frame 38 (FIG. 1) occurs by computer control. The ball nuts 270 are connected to a bracket 205, as best seen in FIGS. 15a and 16. The bracket 205 includes an upper surface, which is bolted to a bottom surface of the lower plate 266 of the table 32. As the ball nuts 270 move along the lead screw 271, the bracket 205 and table 32 are carried with them. A block 207 is welded to a side of the bracket 205 and carries a pair of trip members 209, 211. The member 209 is aligned to engage a home position microswitch 213 at an outer end portion of its travel and, if necessary, an over travel microswitch 215 beyond the inner end of its predetermined travel. The member 211 is aligned to engage an over travel switch 217. The microswitches 213, 217 are disposed adjacent one another and are suitably fastened to a box tube beam 219 which runs the length of the table 32 and which is mounted on a pair of transverse base beams 221.

If, for any reason, the PLC 304 fails to stop the table drive motor 273, a further travel of the table outwardly will cause the trip member 211 to engage the over travel switch 217 to stop the motor 273. If, for any reason, PLC 304 fails to stop the motor 273 when the preselected motor revolutions count is reached, a further predetermined inward movement of the table 32 will cause the trip member 209 to engage the over travel microswitch 215 to cause the computer to stop the motor 273. If, for any reason, the motor 273 fails to stop upon reaching an over travel switch 215 or 217, a rubber pack 207a or 207b or the block 207 will collide with a stop block 219a or 219b welded on an upper edge of the rail 219.

Referring now to FIGS. 1, 12, 12a and 13, there is shown a high pressure water delivery system for the various water jet cutting tools 46 the machine 30. High pressure water, preferably in the range of 30,000 to 55,000 psi, is delivered from a conventional water pressure intensifier, not shown, of any suitable, well known type, high pressure water flows from an intensifier, through a manual shut off valve to the machine 30 through an inlet line 276 (FIGS. 1 and 12). The inlet line 276 branches at a tee 277 into two high pressure water lines 278a and 278b. The branch line 278a joins three tee connectors 279 and one elbow 279a connected in series and, as also seen in FIG. 1, the branch line 278b joins an additional two tee connectors 280 and one elbow 280a, also series connected to one another. High pressure water flows from each of the tee connectors and elbows 279, 279a, 280 and 280a, respectively, through separate lines 281 to seven standard air activated high pressure ON/OFF water valves 282. As shown best in FIG. 13, each of the valves 282 is separately operated by high pressure air supplied from a remote source, not shown, through an air inlet line 283 to an electrically operated solenoid switch 284, and, thence, through the switch, when open, to a valve air inlet line 285 and, finally to a corresponding one of the valves 282. Upon operation of the solenoid switches 284 to open the valves 282, high pressure water is supplied along seven different water lines 286, upwardly over the right side member 39a of the machine frame 38 along arc shaped paths and, thence, downwardly into the machine frame through a series of coils 287 consisting of several circular loops in each of the lines 286 (See FIGS. 1 and 12a). From the coils 287 the lines continue downwardly into the frame 38 to a series of connectors 288 mounted on an angle bracket 289. In the present example of the invention, the two outside water lines 286 are reserved for operation of the cutting tools 46 mounted on the carriage assemblies 44,45 of the track 42. To facilitate movement of these outside lines 286 resulting from movement of the carriage assemblies 44,45 along the track 42, the connectors 288 on these lines connect to swivel connectors 290. Water lines connected to downstream sides of the swivel connectors 290 (See also FIG. 1a) are also coiled, as at 291, to add flexibility, thence connect to a cross 292 where they branch off through three additional coils 293 to the tools 46 of three of the carriage assemblies 44,45.

Figure 21:
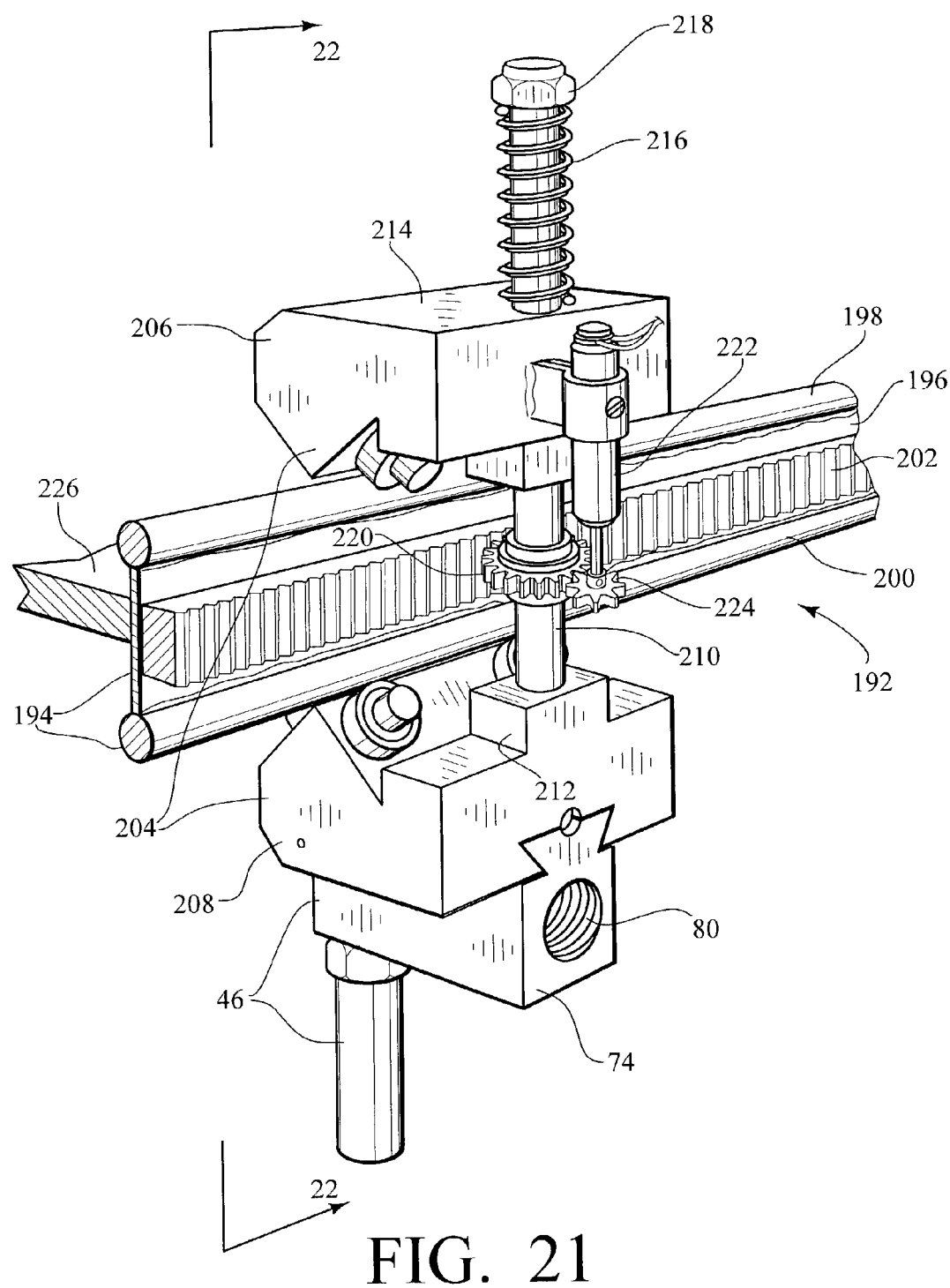
FIG. 21 shows an enlarged perspective view of a portion of the track containing one of the carriages, the same as in FIGS. 19–20.
Figure 22:
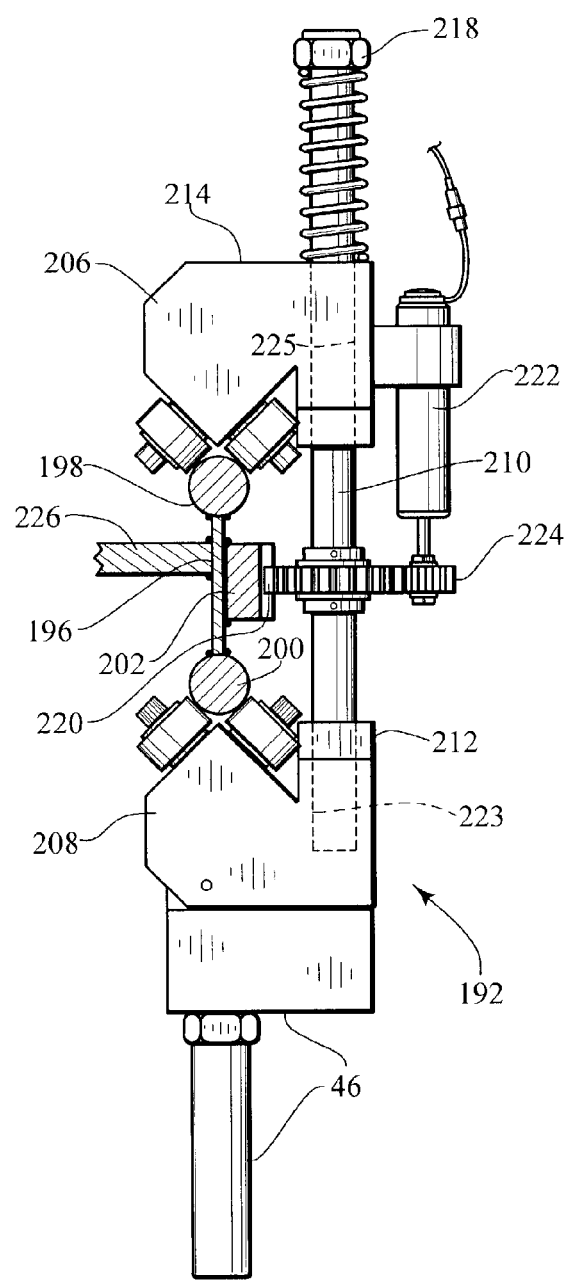
FIG. 22 shows a cross sectional edge view of the track of FIG. 21 and a front elevation view, in full of the carriage of FIG. 21, all as viewed along cross section lines 22 of the latter mentioned figure.
Figure 23:
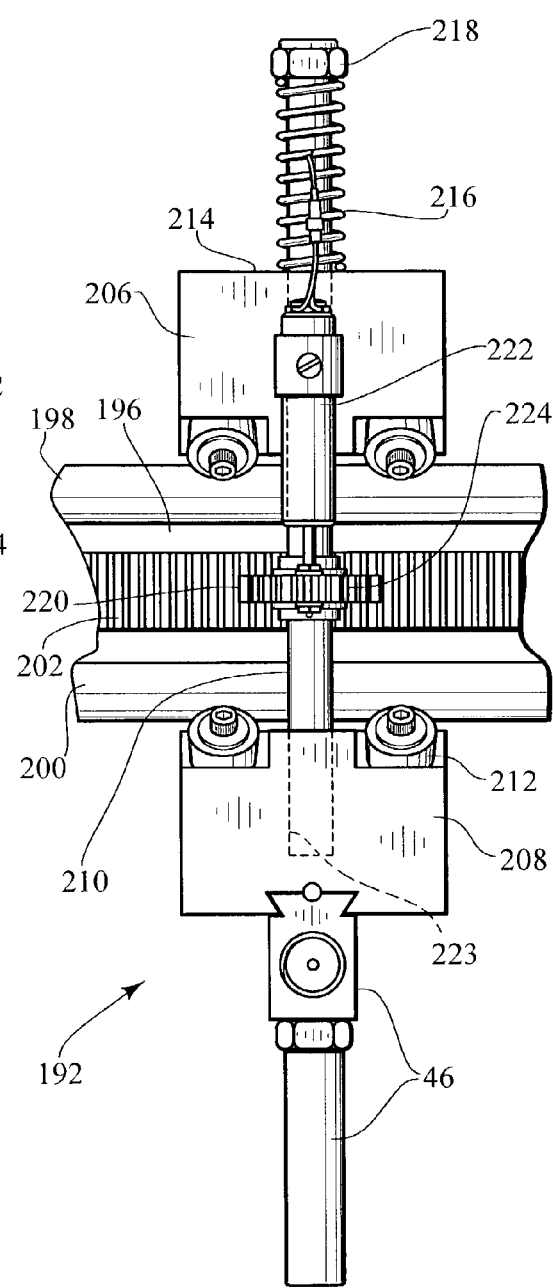
FIG. 23 shows an outer facing side elevation view of the track and carriage of FIG. 22.
Figure 29:
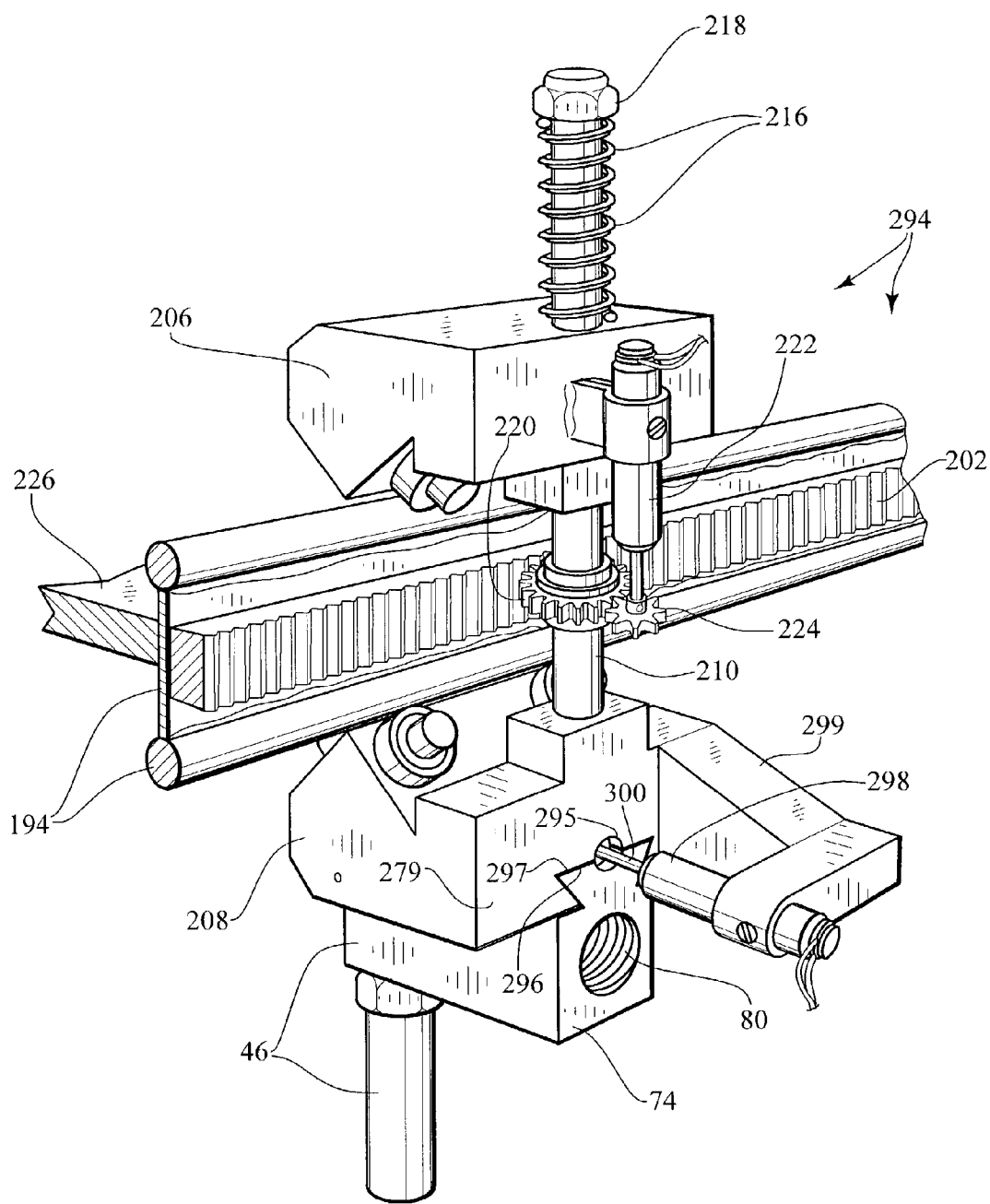
FIG. 29 shows a perspective view of a carriage for a water jet cutting tool for operation on a monorail track wherein the tool can be moved into and away from the monorail track on a servo-mechanism operated block system similar to that shown in FIGS. 27–28 to operate the linearly movable arm.

Referring now to FIG. 29, there is shown, in another important embodiment of the invention, a high pressure water jet carriage assembly, generally designated 294. The assembly 294 is identical to the carriage assembly 192 and is adapted for mounting on the track 194, the same as shown in FIG. 21, except for the addition of an optional motorized adjustment feature for the water jet cutting tool 46 carried thereon. The adjustment feature of the present example is patterned after the adjustment feature for linear extension and retraction of the arm 246 as previously explained and as shown in FIGS. 27–28. By comparison, the upper plate 255 of FIG. 28 now becomes the lower carriage member 208 in FIG. 29. Similarly, the lower plate 253 of FIG. 28 now becomes the block 74 of the tool 46 in FIG. 29. A circular opening 295 is formed which bisects the base of a recessed keyway 296 formed in a lower surface portion of the lower carriage member 208 and an upper surface portion of a conforming key 297. A screw with hex head, such as shown in FIG. 28 at 257 and 260, respectively, is seated in a longitudinally extending groove in the key 297 of block 74. A d.c. motor 298, attached to a generally L-shaped arm 299, is aligned so that a rotary drive shaft 300 of hex shaped cross section couples with the hex head of the screw located within the opening 295. Again, see the similar arrangement of the screw 257 and the hex head 260 of FIG. 28. Activation of the motor 298 rotates the drive shaft 300 to turn the screw 257 to move the block 74 and the entire tool 46 inwardly or outwardly under the track 194, depending upon the polarity of electric power supplied to the motor 298.

Figure 29A:
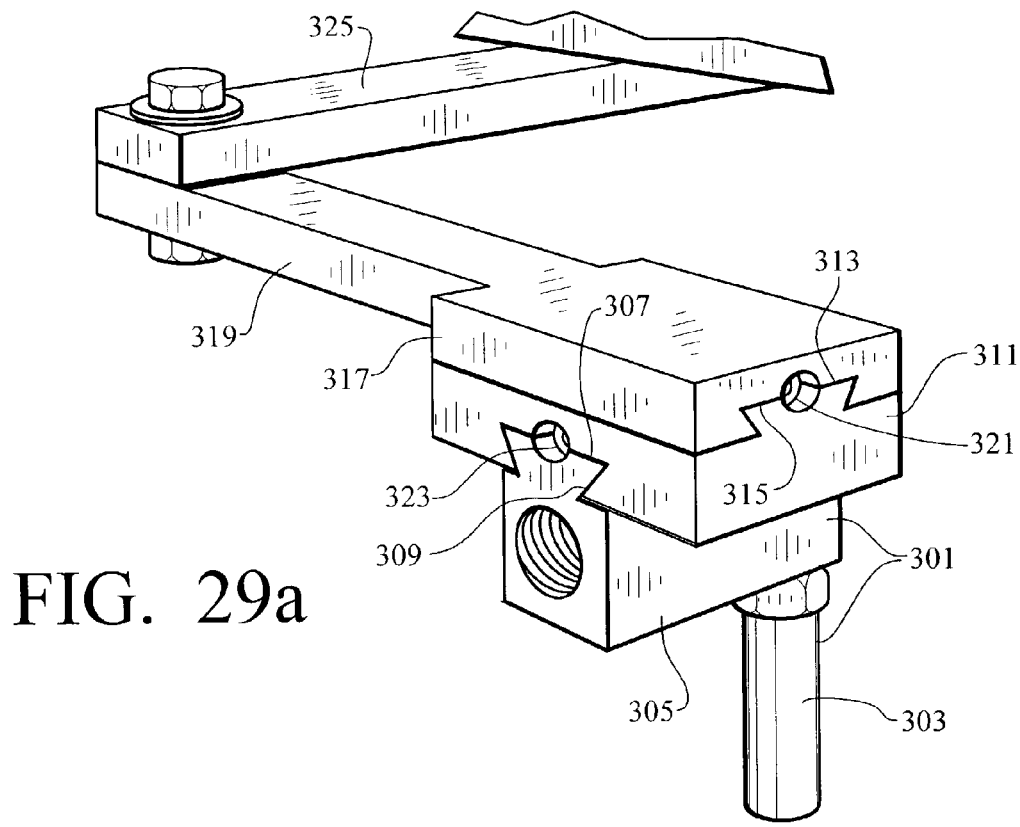
FIG. 29a shows a perspective view of a water jet cutting tool mounted for both lengthwise and transverse adjustment in position on an arm.

Referring now to FIG. 29a there is shown a water jet cutting tool 301, including a nozzle assembly 303 and block 305. A raised key 307 projecting above an upper surface of the tool block 305 slidably engages a closely conforming keyway slot 309 formed in a lower surface portion of a lower block 311. The lower block 311, in turn, contains a raised key 313 which slidably engages a closely conforming keyway slot 315 formed in a base portion of an upper block 317, the upper block being attached to an end of an arm section 319. A screw 321 containing an Allen wrench socket can be rotated to move the lower block 311 along the lower surface of the upper block 317 to extend or retract the tool 301 longitudinally along the arm section 319. Similarly, a screw 323 can be operated with the aid of an Allen wrench to move the tool 301 in a direction transverse to the arm section 319. An arm section 325, bolted on one end to the arm section 319, can be attached to the underside of the plate 164 of the apparatus 142 of FIG. 8 to permit three different adjustments for placing the cutting tool nozzle 303 over the desired position.

Referring now to the drawing figures and, in particular, to FIGS. 18a–18d, There is shown, a simplified block diagram of the electrical, pneumatic, and high pressure water system of this machine 30 (FIG. 1). The 240 vac power distribution block 328 supplies power thru a bank of fuses 330, to the Drives 320, 318,316, 314 then also to a 240 vac/120 vac transformer 326 that provide control power feeds to a +24, +15, −15, +5 VDC regulated power supply 324 that is used to power the HT Modules 306, 308, 310, 312, and a 24 vdc unregulated power supply 332, that feeds a unregulated 24 vdc distribution terminal bank 332a, and thru a circuit breaker block 334 that powers the power supply 338 to the PLC 304. The power supply 338 provides power to the Panelview 336, the panelview 336 provides I/O and information data to and from the Scanner 337 to the PLC 304. PLC'S 304 program is in an automatic mode, as a result of an auto/manual selector switch 353 (See FIGS. 1, & 18d) When in manual mode the operator can enter information into the panelview for specified control of the machines programed parameters (Drive speeds, positions, and timing, etc. . . . ) The description of how the PLC 304 controls one of the servo loops is as follows: the PLC 304 communicate to a servo control module 327a, 327b, 327c, 327d located within the I/O rack 338a of the PLC 304, the servo module 327a, 327b, 327c, 327d communicates to the HT Module 306, 308, 310, 312 that in turn communicates to the Drive 314, 316, 318, 320 of the related axis, and the Drive 314, 316, 318, 320 controls the motors 132, 93, 273, 146 speed and/or position based on the program written in the PLC 304. Which in turn drive some of mechanical devises of this machine 30 (FIG. 1). The description of how the PLC 304 controls one of the high pressure water valves 282 is as follows: The PLC 304 sends a 120 vac signal out of the 120 vac output module 345 located within the I/O rack 338a of the PLC 304 to an air solenoid valve 284 that in turn will send air to the high pressure water valve 282 that directs the flow of high pressure water to the cutting tools 46 (FIGS. 2–4a). The PLC 304 sends a 120 vac signal out of the 120 vac output module 345 to a bank of relays 347 that in turn distributes 24 vdc unregulated power supply 332 power to control small dc motors 262, 251, etc. . . . as needed for special features. If an emergency exists the operator can press the e-stop switch 355 that drops out the MCR (master control relay), (FIG. 18d) this relay 357 will shut off the I/O power, and the regulated DC Power supply 324, and open a contact in the drives over travel limit circuit 322 and a contact sending a signal to the PLC 304 thru a 120 vac input module 343, stopping all the drives 320, 318, 316, 314. If for any reason the Drive 320, 318, 316, 314 fails when (over travel limits 102, 103, 75, 99, 217, 215, (FIGS. 1a, 1e, 1f, 6, 7, 14, 15–15b), over current condition exist within the drive 320, 318, 316, 314, motor over temperature fault 132, 93, 273, 146) any one of these conditions will shut down all the drives 320, 318, 316, 314. The PLC 304 communicates to the Drives 320, 318, 316, 314 via the Servo control Module 327a, 327b, 327c, 327d communicating to the HT Modules 306, 308, 310, 312, the 24 vdc input module 340 receives information from the drive 320, 318, 316, 314 via terminal strip 344 and the PLC 304 communicates information from the 24 vdc output module 342 via terminal strip 344 to the drives 320, 318, 316, 314.

After power is applied to the machine 30 (FIG. 1) it will be necessary to go to the Panelview 336 and reset the e-stop circuit and start a home routine. The home routine will tell the Drives 320, 318, 316, 314 to send all axis's to there zero "0" position or home limits 89, 100, 213 (FIGS. 1e, 6, 7, 15). Now the PLC 304 has taken over control of the machine 30 (FIG. 1) and has placed it in its programmed loop. The start of the programmed loop is waiting for the operator to place the work piece 34 (FIG. 1) on the table 32 (FIG. 1) and press the cycle start switch 95 (FIG. 1).

The sequence of events that take place after the cycle start switch 95 (FIG. 1) is pressed is as follows. The x axis drive motor 273 (FIG. 14) will shuttle the table 32 (FIG. 14) to its programmed position for the first cut of the work piece 34, after reaching the position the z axis motor 132 (FIG. 1a) will move to its pre programmed position and the hole cutter drive will start the rotation of the hole cutter motor 146 that in turn rotates the waterjet aperture cutting device 142, when the z axis motor 132 (FIG. 1a) reaches its pre programmed position, the program will sequence thru the high pressure water valves 2 thru 6 (FIG. 1) turning them on and off as needed to cut the holes and special features, immediately after turning off high pressure water valve number 6 (FIG. 1) the edge trim motor 93 (FIG. 6) will drive at its pre programmed speed to its programmed position. After the edge trim motor 93 (FIG. 6) has drove to its pre programmed position, the z axis motor 132 (FIG. 1a) will move the apparatus 40 (FIG. 1) to a pre programmed clearance position, after reaching the pre programmed clearance position the table will move to the $2^{nd}$ programmed cut position and the same sequence will repeat with the exception of the edge trim which will now move in the reverse direction back to its original starting point, after the $2^{nd}$ part is finished and the z axis motor 132 (FIG. 1a) has moved to its clearance position the table carrying the work pieces will return to the load/unload position that it started in. At this point the program loop is complete and now ready for a cycle start button to be depressed.

Figure 18A:
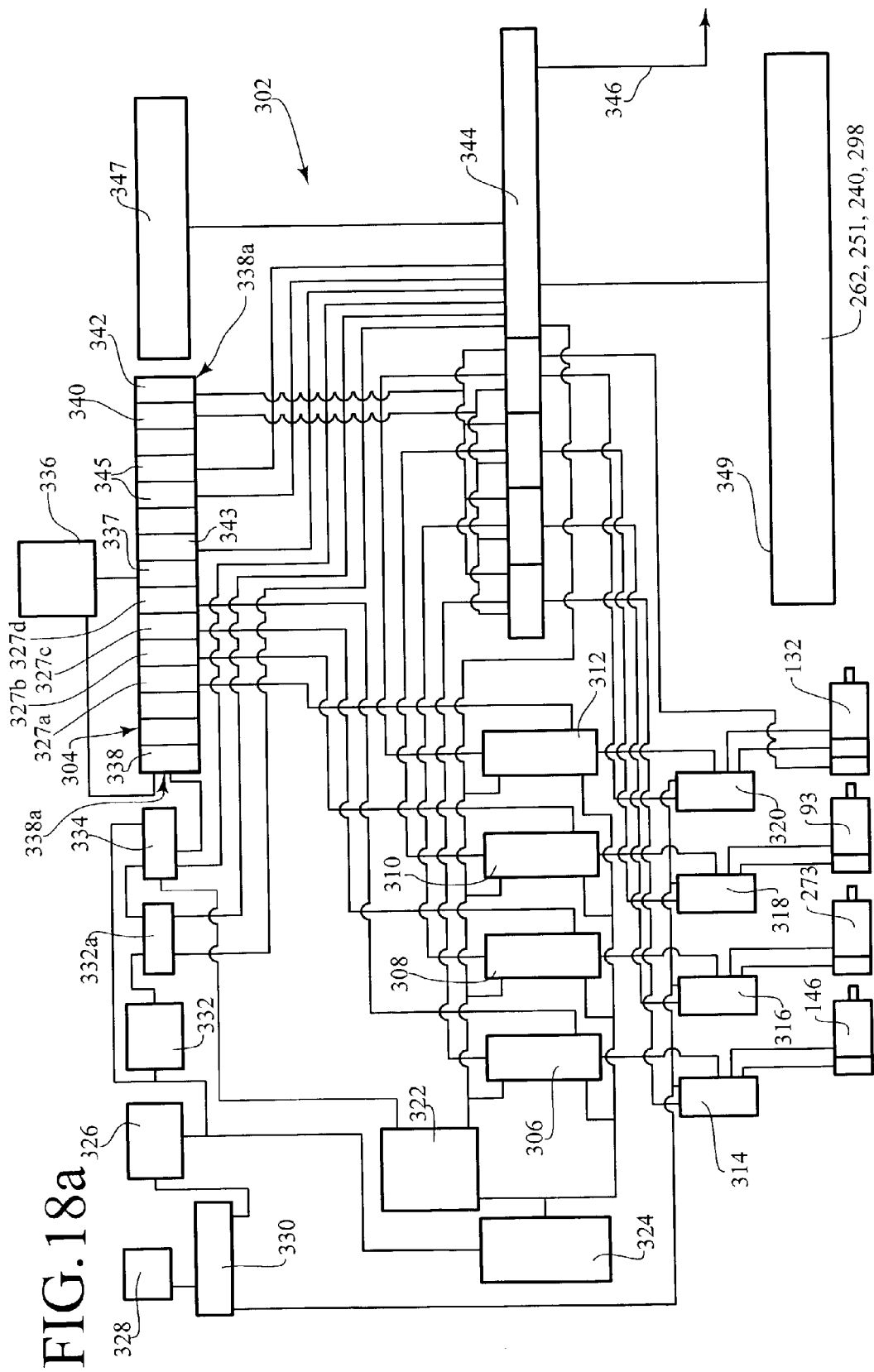
FIGS. 18a–18c, together, show a block diagram for the electrical system and the high pressure air and water systems for the cutting machine of FIG. 1.
Figure 18B:
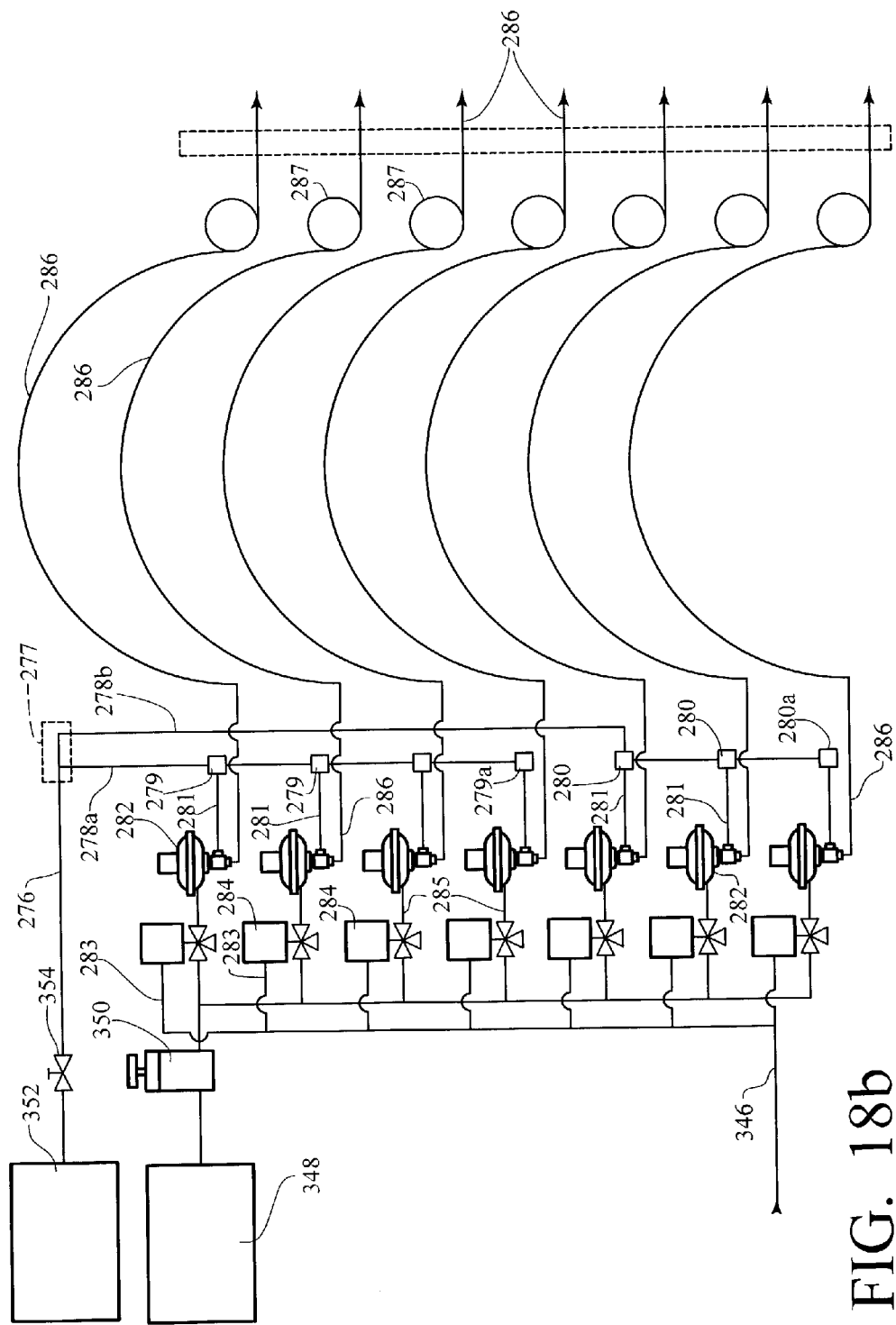
Figure 18C:
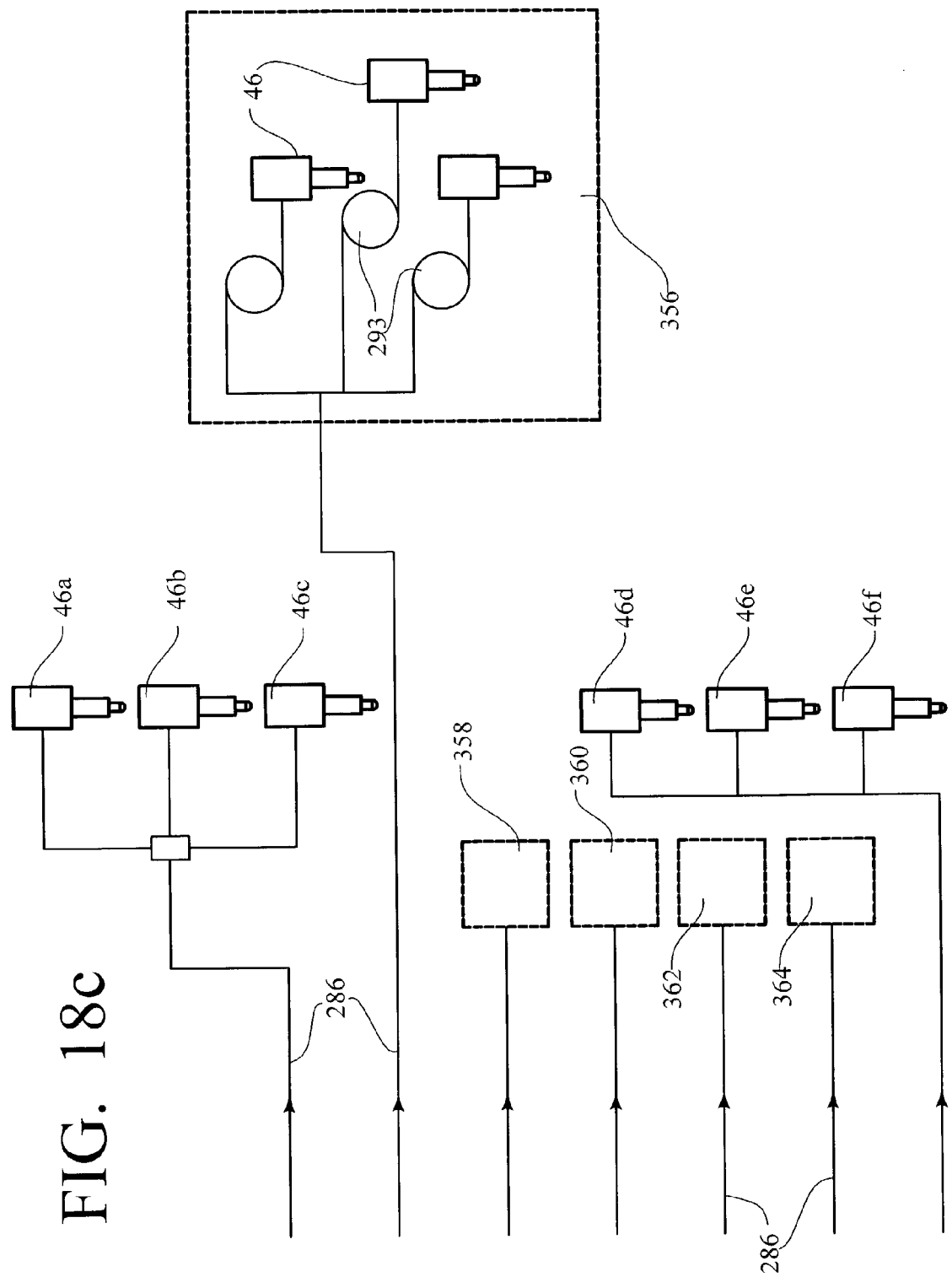
Figure 18D:
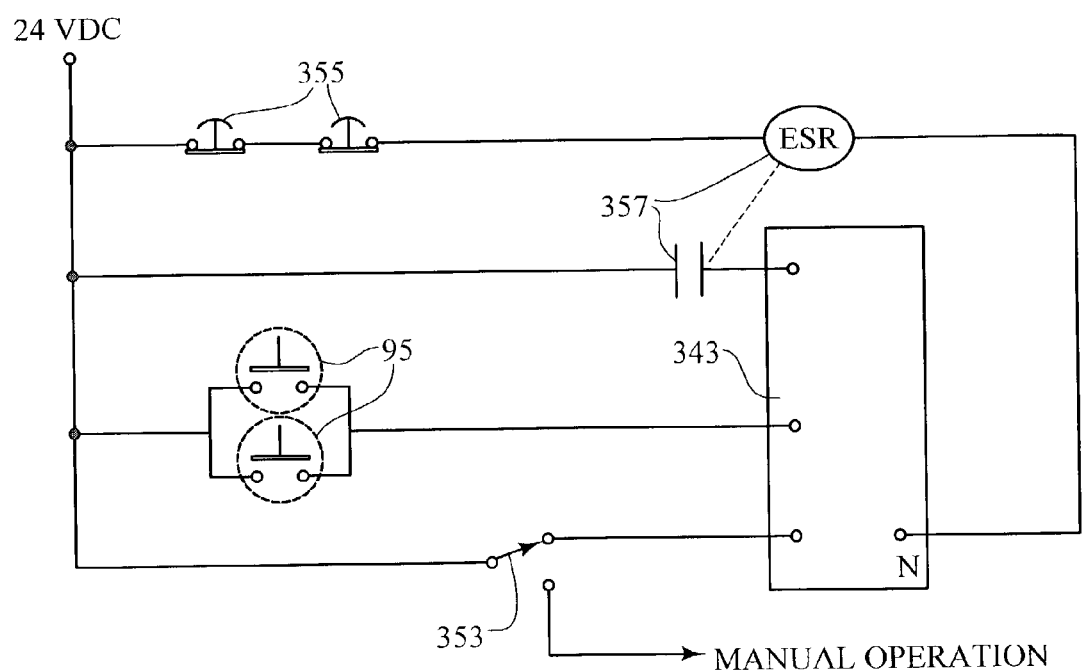
FIG. 18d shows an electrical schematic diagram of a switching circuit for the machine of FIG. 1.

Referring now also to FIG. 18c, the two water lines 286, at the top and bottom of FIGS. 18b–18c, are reserved for operation of the cutting tools 46 carried on the carriage assemblies 44 and 45 on the track 42 of apparatus 40 (See also FIG. 1). In FIG. 18c, tools 46a, b and c represent the three tools carried by three of the carriage assemblies 44 and 45 of FIG. 1, while the tools 46d, e and f represent the additional three tools carried by the remaining three of the carriage assemblies 44 and 45. See, for example, FIG. 6 showing six such carriage assemblies 44 and 45, each of which carries a single one of the tools 46. The remaining five water lines 286 can each operate three water jet aperture cutting tools 46 such as those associated with the aperture cutting device 142 of FIGS. 1 and 6–11. A series of five blocks 356, 358, 360, 362 and 364 each represent three such aperture cutting tools 46 when such tools employ a standard No. 7 nozzle orifice. One of the five blocks 356 is enlarged to show connection of the corresponding water line 286 through the coils 293 to three of the aperture cutting tools 46.

The following tables list examples of certain commercially available components which are suitable for use in the machine 30 of the present invention.

| Component | Manufacturer, Model, Rating |
|---|---|
| Compressed air actuated high press. Water ON/OFF valves 282 (Total of Seven) | Hipco Air Operated Valve, normally closed, 30–100 psi, 60-12HF4 316SS HT#A12140 |
| Elect. Operated high press. Air ON/OFF solenoid switches 284 (Total of Seven) | ASCO Solenoid Valve, Redhat 2, 8320G172 |
| PLC 304 | Allen Bradley, Part No. 1747L542 |
| Input Module 340 | Allen Bradley, 24 VDC, 1746IB16 |
| Output Module 342 | Allen Bradley, 24 VDC, 1746OB16 |
| Motor interface modules 306, 308, 310, and 312 | Allen Bradley, Part No. 1746HT |
| Emergency Stop Switch | Allen Bradley, 3-800T FXD4 |
| Emergency stop circuit 322 | Allen Bradley 1700P-400A1 Relay |
| A.c. to d.c. power supply 324 | 24 v. to 15/5 v., Sola Heavy Duty Model No. GLQ02-200 |
| Panel View 336 | Allen Bradley Model No. 2711-T5A1L1 |
| PLC power supply 338 | Allen Bradley, Part No. 1746P4, chassis 1746A13 |
| Intensifier 352 | Flow 9x, 1.2 gal/min, 30–55K psi |
| Auto/Manual Selector Switch 353 | Allen Bradley, Model No. 800TH2 |
| 120 vac input module 343 | Allen Bradley, 1746IA16 |
| 120 vac output module 345 | Allen Bradley, 1746OA16 |
| HSRV Module 327a, b, c, d | Allen Bradley, 1747HSRV |
| Scanner 337 | Allen Bradley, 1747 SN |

Figure 30:
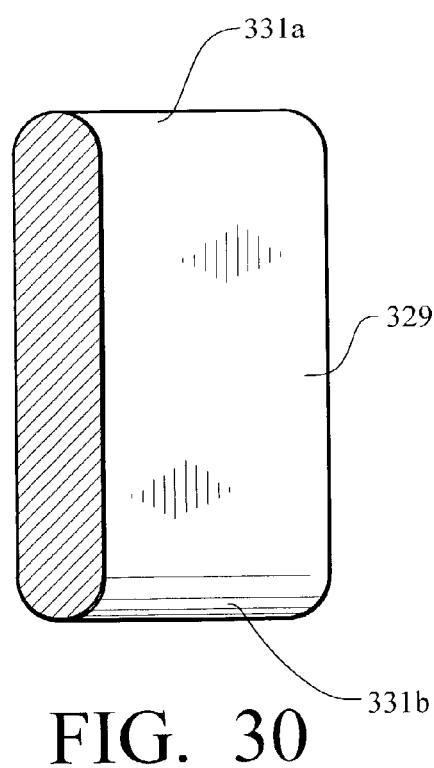
FIGS. 30–31 show perspective views of portions of two additional types of monorail tracks which can be used with the previously disclosed monorail track mounted water jet carriages in the machine of FIG. 1.
Figure 31:
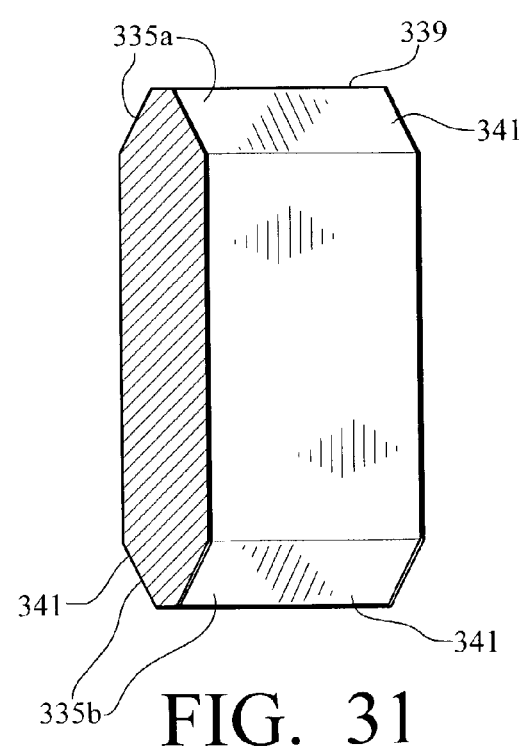

FIGS. 30–31 show two alternative arrangements for the monorail tracks 42 and 194 of the previous examples. In FIG. 30 an alternative monorail track 329 can be integrally fashioned from flexible steel stock such that the upper and lower surfaces 331a, 331b upon which the upper and lower rollers of the carriages 44 are shaped in the form of circular arcs. In FIG. 31 another alternative monorail track 333 can be integrally fashioned to form upper and lower roller bearing surfaces 335a, 335b wherein such bearing surfaces include flat central upper and lower runs 339 between opposing sloping sides 341. These sloping sides 341 may form a right angle between them to match the rollers 58a, 58b of the carriage assembly of FIGS. 2–4, for example.

Although the present invention has been shown and explained with respect to specific details of certain preferred embodiments thereof, it is not intended that such details limit the scope and coverage of this patent other than as expressly set forth in the following claims taking into consideration reasonable equivalents thereof.

I claim:

1. A cutting machine, comprising:
    a machine frame;
    a table for supporting a workpiece material to be cut;
    a cutting apparatus mounted on said frame, said apparatus including an endless track forming a course;
    a plate attached to an inside surface of said track, said plate defining an opening therein and said plate substantially surrounded by said track; and
    an aperture cutting device mounted on said plate for cutting at least one aperture in the workpiece material disposed on said table; a plurality of carriage assemblies movably mounted on said track; a motorized drive assembly for moving said carriage assemblies in unison and in the same direction along separate portions of said track when activated;
    a series of cutting tools each of said tools being mounted on a different one of said carriage assemblies and being activated to cut a different portion of the workpiece material disposed on said table when said drive assembly is activated.

2. The machine of claim 1 wherein said table is mounted on guide blocks which are slidably attached to a pair of spaced apart rails for moving said table between an operative position within said frame and a retracted position.

3. The machine of claim 1 wherein said apparatus is adjustable in height over said table between upper and lower limits.

4. The machine of claim 1 wherein said apparatus is movable horizontally and longitudinally along and over said table between an operative position and rearward position in said frame to permit access to said apparatus for changing tooling, maintaining said apparatus and for other purposes.

5. The machine of claim 1, wherein said aperture cutting device comprises:
    a motorized rotary cam drive assembly containing a first pair of cams and a second pair of cams, said first pair and said second pair being eccentrically mounted on said cam drive assembly for rotation in an essentially 180 degree out of phase relationship between said cam pairs upon rotation of said cam drive assembly;
    a first flat plate defining a first pair of spaced apart circular openings having rims containing a first pair of annularly extending ball bearing races, said first pair of cams being mounted in said first pair of openings for rotation in said first pair of races;
    a second flat plate disposed below said first flat plate defining a second pair of spaced apart circular openings having rims containing a second pair of annularly extending ball bearing races, said second pair of cams being mounted in said second pair of openings for rotation in said second pair of races; and at least one arm containing an aperture cutting tool on one end portion thereof, an opposite end portion of said arm being attached to said second plate such that, upon activation of said cam drive assembly, said first plate and said second plate wobble in circular patterns in horizontal planes so as to counterbalance one another and such that said aperture cutting tool can cut an aperture in the workpiece material disposed on said table.

6. The machine of claim 1, wherein said aperture cutting device comprises:
    at least one arm attached on a first end portion thereof to a lower surface of said plate so as to extend in a fixed position outwardly over said table;
    a circular rotary cam mounted for rotation in a horizontal plane in a second end portion of said arm, said cam carrying a downwardly projecting water jet aperture cutting tool which is eccentrically mounted thereon for rotation about an axis of rotation of said cam; and
    a motorized belt drive mounted on said arm and operatively connected to said cam for rotating said cam when activated such that said aperture cutting tool can be activated to cut an aperture in the workpiece material supported on said table when said belt drive is operating.

7. The machine of claim 1, wherein each of said carriage assemblies comprises:
   an upper carriage member mounted over said track and containing a first set of rollers which bear downwardly on an upper roller bearing surface of said track;
   a lower carriage member mounted under said track and under said upper carriage member and containing a second set of rollers which bear upwardly against a lower roller bearing surface of said track;
   at least one extending bolt slidably adjoining said upper carriage member to said lower carriage member, said lower carriage member being seated on a lower end portion of said bolt, an upper end portion of said bolt projecting upwardly beyond an upper surface of said upper carriage; and
   a spring surrounding said upper end portion of said bolt and being trapped in compression between an upper end of said bolt and an upper surface of said upper carnage member.

8. The machine of claim 1, wherein a first one of said carriage assemblies is connected to said drive assembly for movement along a first portion of said track, said machine further including a cable extending around a surface of said track and having opposite end portions connected to one of said carriage assemblies, each of the remaining ones of said carriage assemblies being fixedly connected to said cable at different spaced apart positions around said track.

9. The machine of claim 1, wherein said motorized drive assembly comprises an endless motorized drive belt mounted on said plate, a driven gear and a follower gear spaced from said driven gear and rotatably mounted on said plate, said belt extending over and between said driven gear and said follower gear such that one side of said belt extends parallel to a straight portion of said track, said belt being connected to a first one of said carriage assemblies.

10. The machine of claim 1 wherein said motorized drive assembly includes an elongated drive gear belt attached to and around an outer facing surface of said track, a series of motorized rotary sprocket gears, each of said motorized sprocket gears being mounted on a different one of said carriage assemblies and engaging said gear belt, said carriage assemblies being movable on said track and along said belt in a single direction of movement around said track upon activation of said series of motorized sprocket gears.

11. The machine of claim 1 wherein said apparatus further includes a plurality of aperture forming cutting tools, said machine further comprising:
   at least one first high pressure ON/OFF water valve mounted on said frame and being connectable on an inlet end to a high pressure water source and being connected on an outlet end to at least two of said carriage member cutting tools;
   at least one second high pressure ON/OFF water valve mounted on said frame and being connectable on an inlet end to said high pressure water source and being connected on an outlet end to at least two aperture forming cutting tools on said apparatus; said first water valve and second water valve being separately operable.

12. The machine of claim 11 wherein said aperture forming cutting tools and said cutting tools are operable in sequence by means of a programmable control system.

13. The machine as in claims 1, or 11 wherein the machine is controlled through a programmable logic controller that directs the machine to act in a desired predetermined manner.

* * * * *

UNITED STATES PATENT AND TRADEMARK OFFICE
CERTIFICATE OF CORRECTION

PATENT NO.       : 7,047,857 B2
APPLICATION NO.  : 10/304636
DATED            : May 23, 2006
INVENTOR(S)      : Adkins It is certified that error appears in the above-identified patent and that said Letters Patent is hereby corrected as shown below:

Claim 7, line 23, please replace "carnage" with -- carriage --.

Signed and Sealed this

First Day of August, 2006

JON W. DUDAS
*Director of the United States Patent and Trademark Office*